United States Patent
Juhasz

(10) Patent No.: US 10,089,647 B2
(45) Date of Patent: Oct. 2, 2018

(54) SYSTEMS AND METHODS FOR ONLINE AD PRICING

(71) Applicant: Sulvo, LLC, Cheyenne, WY (US)

(72) Inventor: Romeo Szilveszter Juhasz, Las Vegas, NV (US)

(73) Assignee: SULVO, LLC, Cheyenne, WY (US)

( * ) Notice: Subject to any disclaimer, the term of this patent is extended or adjusted under 35 U.S.C. 154(b) by 236 days.

(21) Appl. No.: 15/238,640

(22) Filed: Aug. 16, 2016

(65) Prior Publication Data

US 2017/0364945 A1    Dec. 21, 2017

Related U.S. Application Data

(60) Provisional application No. 62/352,978, filed on Jun. 21, 2016.

(51) Int. Cl.
  *G06Q 30/00* (2012.01)
  *G06Q 30/02* (2012.01)

(52) U.S. Cl.
  CPC ..... *G06Q 30/0244* (2013.01); *G06Q 30/0246* (2013.01); *G06Q 30/0273* (2013.01)

(58) Field of Classification Search
  CPC ..................................................... G06Q 30/00
  USPC .......................................................... 705/14
  See application file for complete search history.

(56) References Cited

U.S. PATENT DOCUMENTS

| | | |
|---|---|---|
| 7,330,839 B2 | 2/2008 | Srinivasan et al. |
| 7,752,073 B2 | 7/2010 | Barry et al. |
| 8,082,174 B1 | 12/2011 | Kamangar et al. |
| 8,306,857 B2 | 11/2012 | Lee et al. |
| 8,352,320 B2 | 1/2013 | MacDonald et al. |
| 8,386,299 B2 | 2/2013 | Kumble |
| 8,452,650 B2 | 5/2013 | Paunikar et al. |
| 8,473,346 B2 | 6/2013 | Mattern et al. |
| 8,571,930 B1 * | 10/2013 | Galperin ............ G06Q 30/0273 705/14.43 |
| 8,626,594 B2 | 1/2014 | Chung et al. |
| 8,655,703 B2 | 2/2014 | McGuire |
| 9,230,269 B2 * | 1/2016 | Vempati ................. G06Q 30/02 |
| 2003/0069740 A1 * | 4/2003 | Zeidman ............ G06Q 30/0613 705/1.1 |

(Continued)

OTHER PUBLICATIONS

M. J. S. Yuan, B. Chen, J. Wang, P. Mason, and S. Seljan. An Empirical Study of Reserve Price Optimisation in Real-Time Bidding. In KDD, 2014. (Year: 2014).*

(Continued)

*Primary Examiner* — Eric R Netzloff
(74) *Attorney, Agent, or Firm* — Wilson Sonsini Goodrich & Rosati

(57) ABSTRACT

A computer-implemented method for optimizing publisher profits in online advertising based on real market movements is provided. The method may include dividing an advertisement (ad) placement for an ad unit into a plurality of levels. The method may also include generating a plurality of variables that are configured to test for the real market movements between levels. The method may further include processing ad impressions based on the plurality of variables within a time period to evaluate the real market movements for the ad unit, and determining whether to adjust one or more of the minimum floor prices based on a score for each variable calculated within the time period.

35 Claims, 17 Drawing Sheets

(56) References Cited

U.S. PATENT DOCUMENTS

| | | |
|---|---|---|
| 2004/0167845 A1 | 8/2004 | Corn et al. |
| 2004/0186776 A1 | 9/2004 | Llach |
| 2005/0021440 A1 | 1/2005 | Dresden |
| 2006/0122879 A1 | 6/2006 | O'Kelley |
| 2006/0271438 A1 | 11/2006 | Shotland et al. |
| 2007/0011050 A1 | 1/2007 | Klopf et al. |
| 2008/0103895 A1 | 5/2008 | Burdick et al. |
| 2008/0167943 A1 | 7/2008 | O'Neil et al. |
| 2008/0228583 A1 | 9/2008 | MacDonald et al. |
| 2009/0299798 A1* | 12/2009 | Lejano ............ G06Q 30/02 705/14.48 |
| 2010/0131360 A1* | 5/2010 | Shifflett ............ G06Q 10/087 705/14.48 |
| 2010/0228636 A1 | 9/2010 | Silverman et al. |
| 2010/0241511 A1* | 9/2010 | Cunningham ...... G06Q 30/02 705/14.46 |
| 2011/0131099 A1* | 6/2011 | Shields ............ G06Q 30/02 705/14.71 |
| 2011/0166927 A1 | 7/2011 | Bandi et al. |
| 2012/0226558 A1 | 9/2012 | Robyor |
| 2013/0097028 A1 | 4/2013 | Han et al. |
| 2014/0006172 A1* | 1/2014 | Pardoe ............ G06Q 30/08 705/14.71 |
| 2014/0058849 A1 | 2/2014 | Saifee et al. |
| 2014/0136336 A1* | 5/2014 | Mak ............ G06Q 30/0273 705/14.71 |
| 2014/0172587 A1 | 6/2014 | Somech et al. |
| 2014/0201009 A1 | 7/2014 | Yang et al. |
| 2014/0229295 A1 | 8/2014 | Paunikar et al. |
| 2014/0258000 A1 | 9/2014 | Connolly et al. |
| 2014/0278944 A1* | 9/2014 | Kash ............ G06O 30/0275 705/14.46 |
| 2015/0066660 A1* | 3/2015 | Burke ............ G06Q 30/0275 705/14.71 |
| 2015/0278877 A1* | 10/2015 | Yi ............ G06O 30/0275 705/14.71 |
| 2015/0356632 A1* | 12/2015 | Vempati ............ G06Q 30/02 705/14.71 |
| 2016/0275570 A1* | 9/2016 | Seljan ............ G06Q 30/0275 |

OTHER PUBLICATIONS

Ad exchange. Wikipedia. Last modified on Sep. 1, 2016. 2 pages. https://en.wikipedia.org/wiki/Ad_exchange.

How an Ad is Served with Real Time Bidding (RTB)—IAB Digital Simplified. Published on Jun 19, 2014 on Youtube. 3 pages. https://www.youtube.com/watch?v=-Glgi9RRuJs&spfreload=1.

Lambert. 5 ways to segment Facebook ad campaigns for fast, ROI-driven analysis. Feb. 4, 2014. 5 pages. https://3qdigital.com/socialmedia/5-ways-segment-facebook-ad-campaigns-fast-roi-driven-analysis/.

Measuring geographic performance. Google Adwords. 2016. 5 pages. https://support.google.com/adwords/answer/2453994?hl=en.

Online advertising. Wikipedia. Last modified on Sep. 5, 2016. 11 pages. https://en.wikipedia.org/wiki/Online_advertising.

* cited by examiner

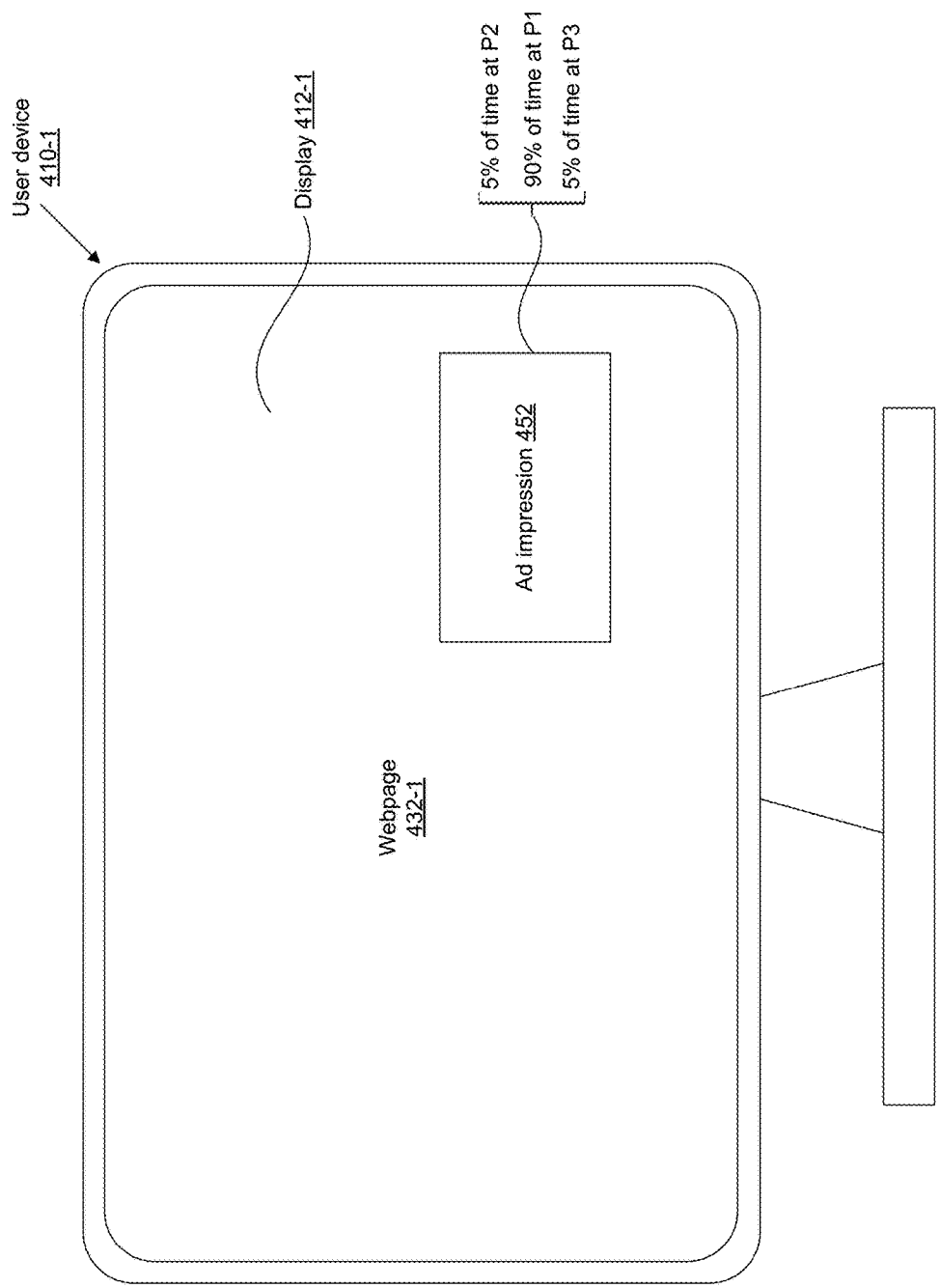

SYSTEMS AND METHODS FOR ONLINE AD PRICING

CROSS-REFERENCE

This application claims the benefit of U.S. Provisional Application No. 62/352,978 filed Jun. 21, 2016, which is incorporated herein by reference in its entirety.

BACKGROUND

A significant quantity of content published on the Internet is supported by online advertisements ("ads"). The process by which online advertising is displayed to end users can involve many parties. A publisher of online content, such as a website, may place an ad request to fill available ad space complementary to that content. The ad space may be offered for sale in a bidding market using an ad exchange and real-time bidding. This may involve numerous parties interacting automatically and exchanging information. The information may include personal information and online behavior of the end users.

In current real-time bidding (RTB) sales models, publishers often do not have access to real-time information about market movements that may allow the publishers to optimize and adjust floor prices. For example, publishers may not know the amounts that advertisers are willing to pay for different ad placements and/or at different time instances. In some cases, setting a floor price too high may turn away buyers (advertisers) at the risk of not finding another buyer later, and potentially compromise publisher profits. Conversely, setting the floor price too low could deprive the publishers an opportunity to maximize profits, when in fact the buyers (advertisers) are willing to pay more.

SUMMARY

Accordingly, recognized herein is a need for systems and methods that can (1) test for and determine real-time information about market movements, and (2) use the information to dynamically set floor prices at which publisher earnings can be maximized for an ad placement.

Various embodiments of the present invention can address the above need. The systems and methods disclosed herein can maximize publisher earnings by optimizing the entire displayable area ("real estate") of ad placements, without focusing on a single impression floor price. For example, the overall earnings of an ad placement for an ad unit can be maximized by dynamically adjusting minimum floor prices at different levels over different time periods based on real-time market movements. Additionally, the systems and methods disclosed herein allow publishers to maximize earnings without requiring user-specific impression data and buyer information to predict an impression value upfront. The user-specific impression data may include personal information and online behavior of the end users, which are often obtained through the use of cookies. The buyer information may include identities of the buyers, as well as their historical bid data (e.g., bid prices and patterns). As such, the systems and methods disclosed herein can help in maintaining user privacy and advertiser privacy, and preserve the interests of both publishers and advertisers during an ad placement bidding process.

In an aspect of the present disclosure, a computer-implemented method for optimizing publisher profits in online advertising based on real market movements. The method may comprise: dividing an advertisement (ad) placement for an ad unit into a plurality of levels; generating a plurality of variables in a computer memory that are configured to test for the real market movements between levels, wherein the plurality of variables comprise (1) a first variable in which a first minimum floor price is used as a baseline, (2) a second variable in which a second minimum floor price is set to be a predetermined percentage above the first minimum floor price, and (3) a third variable in which a third minimum floor price is set to be the predetermined percentage below the first minimum floor price; processing ad impressions based on the plurality of variables within a time period to evaluate the real market movements for the ad unit; and determining whether to adjust one or more of the minimum floor prices based on a score for each variable calculated within the time period.

A system for optimizing publisher profits in online advertising based on real market movements is provided in accordance with another aspect of the invention. The system may comprise: a market analysis server in communication with an ad exchange server and one or more ad network servers. The market analysis server may comprise one or more processors that are individually or collectively configured to: divide an advertisement (ad) placement for an ad unit into a plurality of levels; generate a plurality of variables in a computer memory that are configured to test for the real market movements between levels, wherein the plurality of variables comprise (1) a first variable in which a first minimum floor price is used as a baseline, (2) a second variable in which a second minimum floor price is set to be a predetermined percentage above the first minimum floor price, and (3) a third variable in which a third minimum floor price is set to be the predetermined percentage below the first minimum floor price; process ad impressions via the ad server based on the plurality of variables within a time period to evaluate the real market movements for the ad unit; and determine whether to adjust one or more of the minimum floor prices based on a score for each variable calculated within the time period.

In another aspect of the present disclosure, a tangible computer readable medium storing instructions that, when executed by one or more servers, causes the one or more servers to perform a computer-implemented method for optimizing publisher profits in online advertising based on real market movements is provided. The method may comprise: dividing an advertisement (ad) placement for an ad unit into a plurality of levels; generating a plurality of variables that are configured to test for the real market movements between levels, wherein the plurality of variables comprise (1) a first variable in which a first minimum floor price is used as a baseline, (2) a second variable in which a second minimum floor price is set to be a predetermined percentage above the first minimum floor price, and (3) a third variable in which a third minimum floor price is set to be the predetermined percentage below the first minimum floor price; processing ad impressions based on the plurality of variables within a time period to evaluate the real market movements for the ad unit; and determining whether to adjust one or more of the minimum floor prices based on a score for each variable calculated within the time period.

Other objects and features of the present invention will become apparent by a review of the specification, claims, and appended figures.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4A shows an example of an available ad impression on a desktop computer that is being tested at different floor prices, in accordance with some embodiments;

DETAILED DESCRIPTION

Figure 1:
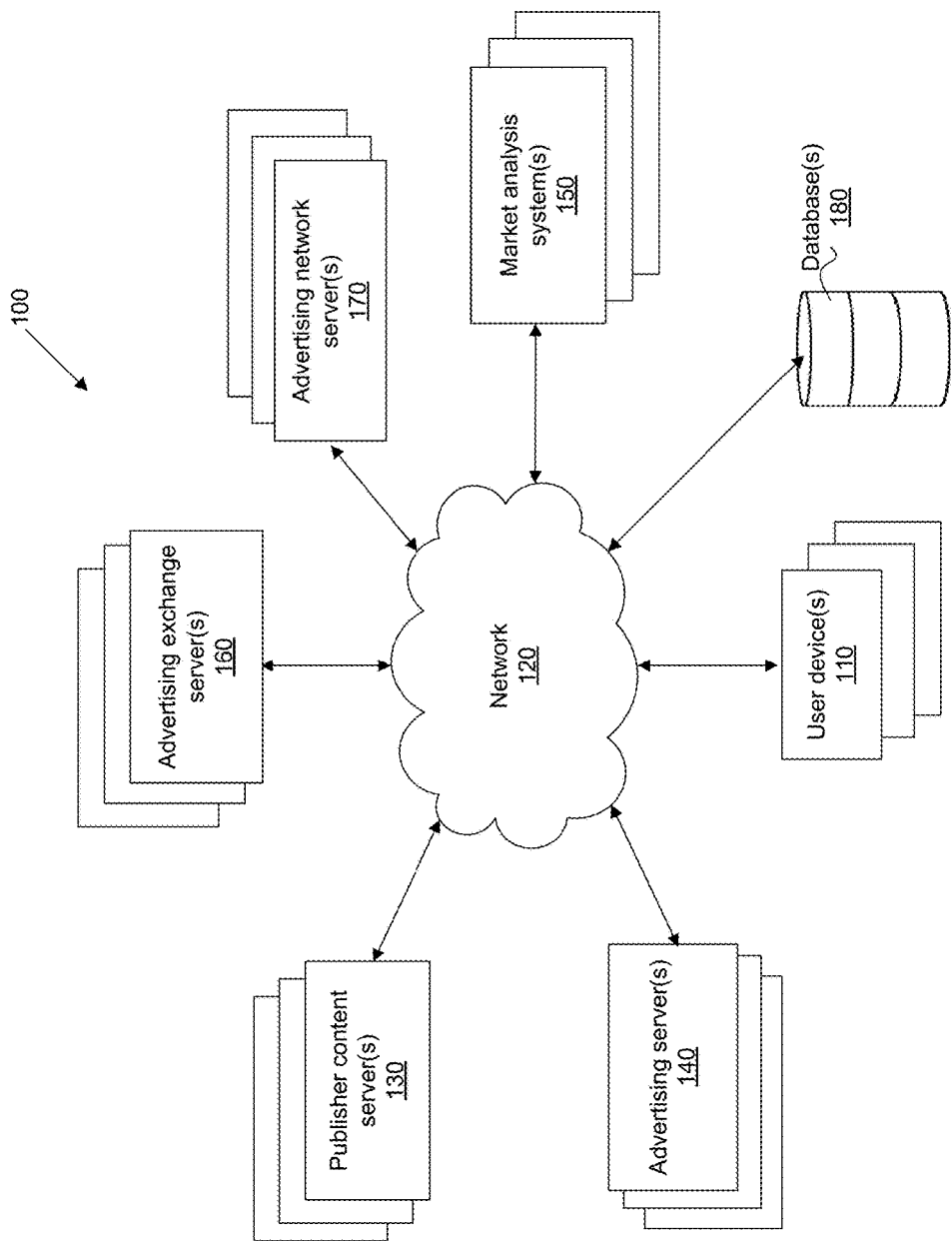
FIG. 1 illustrates an exemplary advertising network layout in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Real-time bidding (RTB) is a sales channel in which a publisher of online content, such as a website, may place an ad request to fill available ad space complementary to that content. An ad impression may be defined as a single instance of an ad appearing on a website (i.e., an end user sees the advertisement). An advertiser may define an ad campaign to include a number of ad impressions sought and a monetary amount budgeted to purchase the desired impressions. Multiple advertisers, in pursuit of their respective ad campaigns, may place auction-style bids on desired ad impressions, with the targeted ad impression going to the highest bidder. Real-time bids submitted by the multiple advertisers are considered not only against one other, but also against other conditions of the ad request, such as a floor price (a reserve price) below which a publisher will not sell a particular ad space. The automated processing of these and other conditions precedent to completing the RTB transaction takes place in milliseconds, resulting in ad delivery that appears to a target consumer to occur almost instantaneously.

A real-time bidding (RTB) sales model has the potential to give publishers access to more advertising demand sources and, consequently, to increase publisher revenue. However, current RTB sales models tend to favor the interests of advertisers over those of publishers. For example, many RTB auctions are "second price" auctions, which means the winning bidder pays only slightly more than the next highest bidder's offer. Allowing advertisers to reach their target consumers at the lowest possible price using a second price auction creates downward pricing pressure that may negatively impact publisher revenue.

In some cases, a publisher may attempt to protect against this downward pricing pressure by setting a floor price. However, publishers often do not have access to real-time information about market movements in order to optimally set a floor price, and/or adjust the floor prices in response to changing market conditions. For example, publishers may not know the amounts that advertisers are willing to pay for an ad unit over different time periods. In some instances, setting a floor price too high may turn away buyers (advertisers) at the risk of not finding another buyer within a reasonable time period, and potentially compromise (reduce) publisher profits. Conversely, setting a floor price too low could deprive a publisher the opportunity to maximize profits, when in fact the advertisers may be willing to pay more.

Current RTB sales models also attempt to predict impression values upfront based on the value of the publisher's website, the advertisers' historical bidding patterns, and/or the end users' personal information and online behavior. Some of the above-described data can contain sensitive and/or confidential information, which advertisers and publishers may not be willing to share with each other, and which the end users may not be willing to provide. The sharing of the end users' personal information and online behavior may also raise issues of user privacy. Additionally, the focus on specific impressions can result in current RTB models failing to account for overall earnings of an ad placement. For example, current RTB models often do not account for bottom level ad units (lower value ad units), and therefore are not able to extract potential earnings from those bottom level ad units.

Methods and systems of the present disclosure can address at least the above deficiencies relating to the sale of online ads. Online ads, as used herein, are intended to include any type of advertising media that is provided electronically to one or more users. Exemplary methods and systems for dynamically determining and selecting minimum floor prices based on market movements are described herein below. In the following description, for purposes of explanation, numerous specific details are set forth to provide a thorough understanding of example embodiments. However, methods and systems of the present disclosure may be practiced without these specific details and/or with different combinations of the details than are given here. Thus, specific embodiments are given for the purpose of simplified explanation and not limitation.

Systems and methods for dynamically determining and selecting floor pricing in a real-time bidding scenario are next described in greater detail. Throughout this disclosure, the present invention may be referred to as a market analysis system, a computer program product, a computer program, a system, and/or a method. Those skilled in the art will appreciate that this terminology does not affect the scope of the invention as outlined herein. In the following disclosure, the present invention may be referred to as relating to adverts, advertisements, marketing campaigns, unsolicited content, and ads. Those skilled in the art will appreciate that this terminology is only illustrative and does not affect the scope of the invention. For instance, the present invention may just as easily relate to electronic coupons, political messages, public service, announcements, or informational broadcasts.

FIG. 1 illustrates an exemplary advertising network layout 100, in accordance with some embodiments. As described in greater detail elsewhere herein, different embodiments of advertising networks may be configured, designed, and/or operable to provide various different types of operations, functionalities, and/or features generally relating to advertising technology. According to different embodiments, the advertising network layout 100 may include a plurality of different types of components, devices, modules, processes, systems, etc., which, for example, may be implemented and/or instantiated via the use of hardware, software, and/or combinations of hardware and software.

In the example of FIG. 1, the advertising network layout 100 may include a user device 110, a communications network 120, a publisher content server 130, an advertising server 140, a market analysis system 150, an advertising exchange server 160, an advertising network server 170, and a database 180. One or more components in the network layout 100 may be provided in plural. For example, in some embodiments, a plurality of market analysis systems 150 may be provided to test for and monitor market movements relating to online ad pricing, and to adjust minimum floor prices for an ad placement of an ad unit to optimize publisher revenue based on the market movements. The market movements may be indicative of the supply/demand patterns and pricing sensitivities of publishers (suppliers) and advertisers (buyers) for the ad placements.

Each of the components may be operatively connected to one another via the network 120 or any type of communication link that allows transmission of data from one component to another. One or more of the components may be directly connected to the network 120, or indirectly to the network via a server, a network interface device, or any other device capable of making such a connection. Alternatively, or in addition, one or more of the components may be configured to be connected with the network 120 via a hotspot that, for example, may employ a router connected to a link to a network. For example, and without limitation, one or more components may be connected to the Internet by a wireless fidelity (WiFi) connection. A network interface device may be any type of network interface device, including, without limitation, an Ethernet card and a wireless communication device such as an 802.11/WiFi network interface or a Wireless LAN device. A mobile network may be any type of cellular network device, including GSM, GPRS, CDMA, EV-DO, EDGE, 3G, DECT, OFDMA, WIMAX, and LTE communication devices. These and other communication standards permitting connection to the network 120 may be supported within the invention. Moreover, other communication standards connecting one or more components with an intermediary device that is connected to the Internet, such as USB, FireWire, Thunderbolt, and any other digital communication standard may be supported by the invention.

The user device(s) 110 may include, for example, one or more computing devices that are capable of electronically navigating to a publisher's website hosted on the publisher content server 130. A user device can include, among other things, desktop computers, laptops or notebook computers, mobile devices (e.g., smart phones, cell phones, personal digital assistants (PDAs), and tablets), or wearable devices (e.g., smartwatches). A user device can also include any other media content player, for example, a set-top box, a television set, a video game system, or any electronic device capable of providing or rendering data. A user device may include various computing components, such as one or more processors, and one or more memory devices storing software instructions executed by the processor(s) and data.

In some embodiments, the network layout may include a plurality of user devices. Each user device may be associated with a user. In some embodiments, more than one user may be associated with a user device. Alternatively, more than one user device may be associated with a user. The users may be located geographically at a same location, or at different geographical locations (e.g., different cities, countries, etc.), although this is not a limitation of the invention.

In some embodiments, the network layout may include a plurality of nodes. Each user device in the network layout may correspond to a node. A node may be a logically independent entity in the network layout. Therefore, the plurality of nodes in the network layout can represent different entities. For example, each node may be associated with a user, a group of users, or groups of users. For example, in one embodiment, a node may correspond to an individual entity (e.g., an individual). In some particular embodiments, a node may correspond to multiple entities (e.g., a group of individuals).

The publisher content server 130 may be managed by a publisher. In some instances, the publisher content server 130 may be managed by a third party entity on behalf of the publisher or another entity. The publisher content server 130 may be configured to render and provide access to one or more Internet-based websites, webpages, etc. The publisher content server 130 may be configured to store one or more webpages comprising the publisher's website. Alternatively, one or more webpages may be stored in a database (e.g., database 180). The publisher content server 130 may be in operable communication with the database, and configured to access and/or retrieve the webpages from the database. The publisher's webpages may include digital information in the form of primary content (e.g., the publisher's website) and complementary content (such as advertisements, pictures, figures, text, videos, audio recordings) or any other digital content. The user device may be configured to display the one or more webpages when the user electronically navigates to the publisher's website using the user device.

The publisher's webpage may include one or more lines of executable computer program codes for generating an ad call when the webpage is loaded on a web browser on the user device. An ad call may be referred to interchangeably herein as an ad request. An ad call is a call that is made by the web browser on the user device for an ad to be displayed on the webpage. It should be noted that ads are typically not part of the content of the webpages, and are usually stored separately from the webpage content. For example, different ads may be stored in different ad databases and/or on different advertising servers.

An ad call may be considered as a request from a client (user) to a server (e.g., market analysis system, ad exchange server, ad network server, etc.) for an ad impression to be delivered. An ad call may comprise information about the publisher ID, browser cookies, size, location, etc. In some embodiments, when the codes for the ad call are executed on the user device, the market analysis system may obtain information about the available ad impression from the user device, and make an ad call to the ad exchange server 160 on behalf of the user device. Alternatively, the market analysis system may also obtain information about the available ad impression from the publisher content server 130. The ad call may include a request for an ad to be loaded with the content of the webpage in the browser on the user device. The advertising exchange server may further put up the available ad impression in an online auction to potential buyers (e.g., advertising networks). A buyer that puts in the winning bid obtains the right to post an ad. Each ad that is fully loaded on the webpage may be counted as one ad impression.

The ad server 140 may be a web server that stores advertising content used in online marketing and delivers that content onto various digital platforms such as; websites, social media outlets and mobile apps. The ad server may be configured to distribute the advertising material into appropriate advertising slots online. The ad server may be managed by an entity that provides software to websites and advertising companies to serve ads, count them, choose the ads that will make the website or advertiser the most money and monitor the progress of different online advertising campaigns. The ad server 140 may be configured to deliver ads to users, to manage the advertising space of a website and, in the case of third party ad servers, to provide an independent counting and tracking system for advertisers/marketers. The ad server 140 can also count clicks/impressions in order to generate reports, which helps advertisers to determine the ROI for an advertisement on a particular web page. The ad server 140 can be managed or used by the publishers. Alternatively, the ad server 140 can be managed or used by third parties such as demand partners/advertising networks (e.g., advertisers, marketers, etc.).

In some embodiments, the ad network server 170 may include API-based ad serving networks such as "Adnet" or Server-to-Server ("S2S"). Different API-based ad serving networks may be classified as either Beacon Based Counting (BBC) Networks or Server Side Counting Networks (Non BBC). A Server Side Counting Network may count an impression (e.g., for CPM purposes) when the network responds with a valid creative. This may also be referred to as Server based counting (e.g., an impression is counted once the creative is returned). Alternatively, a Beacon Based Counting Network counts an impression when the creative is rendered (e.g., via use of a beacon). For example, in Beacon based Counting (BBC), an impression is counted by the network once the ad serving beacon is executed.

In some embodiments, the ad network server 170 may include one or more Demand Side Platforms (DSPs) associated with one or more advertisers and/or ad serving entities. In some instances, the advertisers and/or ad serving entities may participate in real-time bidding or auctioning of ad impressions. The real-time bidding or auctioning of ad impressions may be facilitated using the ad exchange server 160. The ad exchange server may allow one or more advertisers to participate in real-time bidding for desired ad impressions. For example, advertisers may use the real-time bidding to bid on ad space, rather than pay the publisher's set price for the ad space.

The ad exchange server 160 may comprise a real-time bidding (RTB) engine configured to manage calls to one or more ad network servers 170, to determine which of several competing advertisers wins an auction bid to serve an ad to a publisher's webpage. The computer-programmed instructions that may constitute the RTB engine and/or the transaction data manipulated during the RTB process may be stored to and retrieved from an exchange database (e.g., database 180). The exchange server may execute the RTB engine to determine which ad networks should be exposed to a publisher's ad request, and may create a request package for each ad network server containing information for the advertiser to make a bidding decision. The information may include, for example auction criteria and floor prices that are set by the market analysis system 150.

The highest bidding advertiser may be allowed by the ad exchange server 160 to serve the ad placement. More specifically, the RTB engine may route the ad to the publisher webpage, may inform the ad network server 170 of its winning bid, and may communicate the clearing price for the ad placement to facilitate payment. Alternatively, the ad network server 170 may respond to an ad request package with a signal indicating a decision not to bid on the impression. The RTB engine may record information regarding winning bids, failed bids, and no bids (also referred to as passbacks) for the ad impression and may transmit that package to the soliciting publisher.

The market analysis system 150 may include one or more servers which may communicate directly and/or indirectly with other components/entities of the advertising network layout 100. The market analysis system 150 may store and/or execute software that performs algorithms for dynamically determining and setting minimum floor prices for various ad placements to optimize publisher revenues, as described in detail later in the specification.

Any of the servers described herein may include a web server, an enterprise server, or any other type of computer server, and can be computer programmed to accept requests (e.g., HTTP, or other protocols that can initiate data transmission) from a computing device (e.g., a user device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include various computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers. In some embodiments, multiple devices may implement the functionality associated with one server.

Although particular computing devices are illustrated and networks described, it is to be appreciated and understood that other computing devices and networks can be utilized without departing from the spirit and scope of the embodiments described herein. In addition, one or more components of the advertising network layout 100 may be interconnected in a variety of ways, and may in some embodiments be directly connected to, co-located with, or remote from one another, as one of ordinary skill will appreciate.

Figure 2:
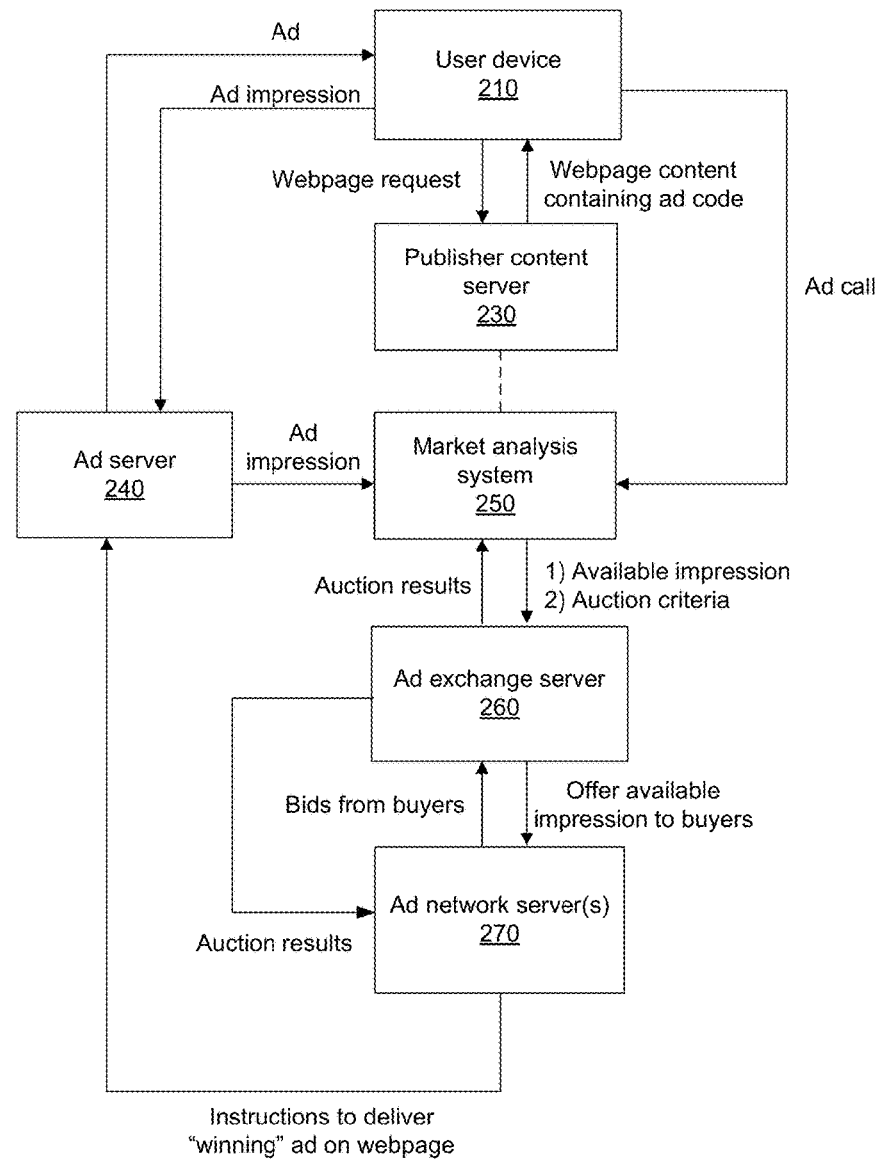
FIG. 2 illustrates an advertising network layout and handling of an ad call (ad request), in accordance with some embodiments.

FIG. 2 illustrates an advertising network layout and handling of an ad call (request), in accordance with some embodiments. An ad call may be a request for an ad to be displayed on a webpage, as previously described. Referring to FIG. 2, a user device 210 may be associated with a user. The user device may be a desktop computer or a mobile device. The user may use a web browser installed on the user device to access a publisher's webpage hosted on a publisher content server 230. When the user loads the webpage onto the browser, a webpage request is sent from the user device to the publisher content server, that opens a connection to the publisher content server. The publisher content server may be configured to provide contents of the webpage to the user upon receiving the webpage request, to be rendered in the browser on the user device.

The contents of the webpage may be in the form of HTML, and may include an ad code. The ad code may comprise an ad impression that is available for display on the webpage. The ad code may also include a location on the webpage where the ad impression is to be displayed. The location may be defined with respect to the viewable space on a webpage when it first loads in the browser on the user device. For example, the ad code may indicate whether the ad impression is above the fold (ATF) or below the fold (BTF). ATF ads may be more likely to be interacted or clicked on by a user since they are in the displayed area of the webpage. Conversely, BTF ads may be less likely to be interacted or clicked on by a user, since the user has to scroll below the "fold" line in order to view the ad.

Figure 3:
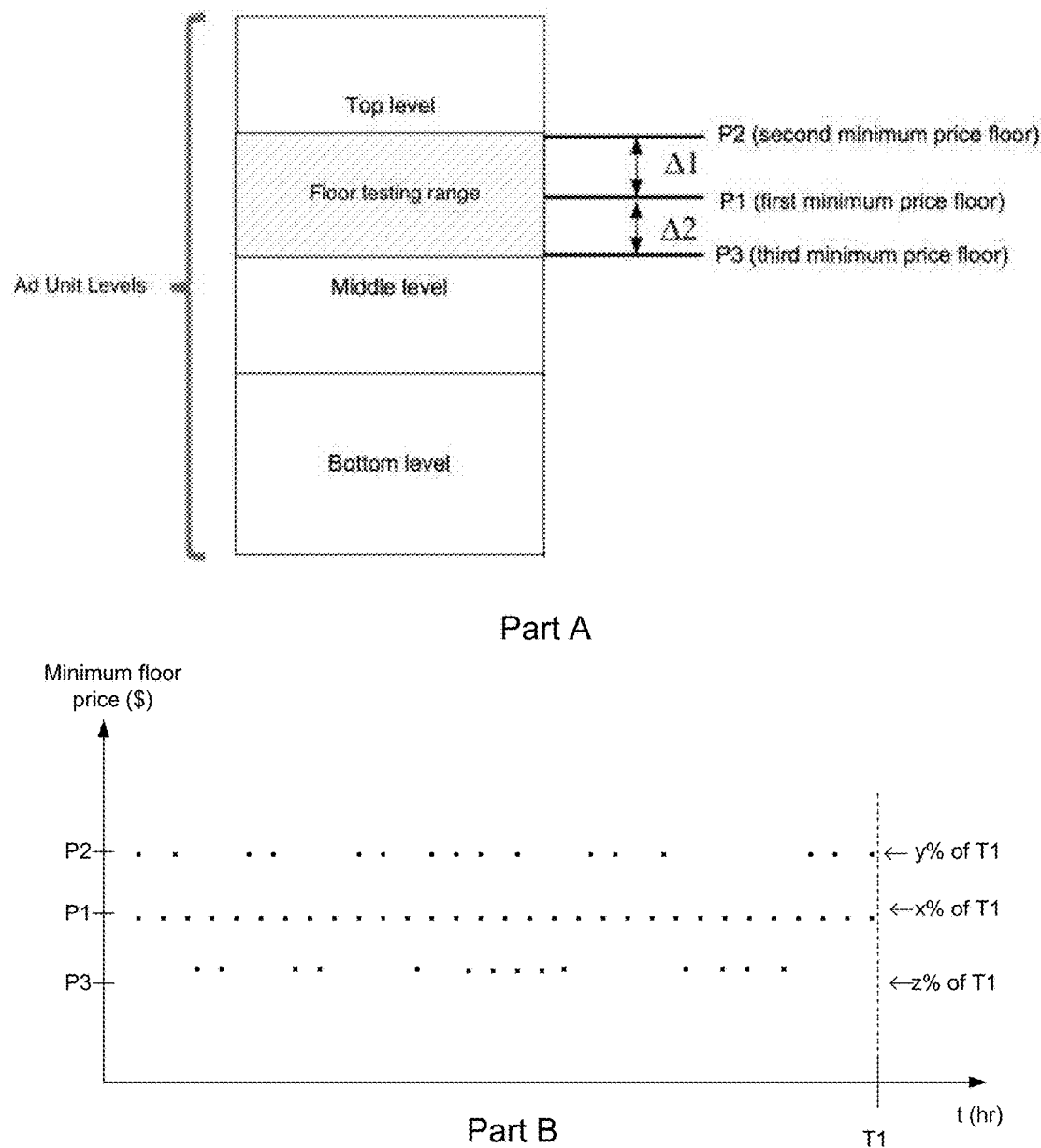
FIG. 3 illustrates the dividing of an ad placement for an ad unit into a plurality of levels, and testing at different floor prices between levels, in accordance with some embodiments.

When the browser on the user device executes the ad code, the browser may transmit an ad call (or ad request) to a market analysis system 250. The ad call is a request to obtain an advertising payload (i.e., an ad) for display in the available impression location. The ad call may be an ad placement (i.e., placement for an ad). The market analysis system may be configured to process the ad call, by transmitting the available impression with a set of auction criteria to an ad exchange server 260. The market analysis system may be configured to monitor and determine real market movements based on the auction criteria, and optimize the publisher profits by adjusting floor prices based on the real market movements. For example, the market analysis system may be configured to divide the ad placement for an ad unit into a plurality of levels. In some embodiments (for example as shown in part A of FIG. 3), the ad unit levels may comprise a middle level having a first price range, a top level having a second price range, and a bottom level having a third price range. A plurality of minimum floor prices may be provided between ad unit levels. For example, as shown in part A of FIG. 3, a plurality of floor prices (P1, P2, and P3) may be provided between the top level and the middle level. A first floor price P1 may be less than a second floor price P2, and greater than a third floor price P3. The different floor prices may be used to test market movements for an ad unit between levels (to determine whether advertisers are willing to pay more or pay less for a given ad unit), as described below.

The market analysis system may be configured to generate a plurality of variables that are designed to test for real market movements of the price of an ad unit. The plurality of variables may be included in the set of auction criteria. In some embodiments, the plurality of variables may comprise (1) a first variable in which the first minimum floor price P1 is used as a baseline, (2) a second variable in which the second minimum floor price P2 is set to be a first predetermined percentage $\Delta 1$ above the first minimum floor price, and (3) a third variable in which the third minimum floor price P3 is set to be a second predetermined percentage $\Delta 2$ below the first minimum floor price. (See, for example, part A of FIG. 3). The second variable and the third variable may be test variables that are usable in conjunction with the first variable to test for the real market movements relating to the ad pricing between levels. The first, second, and third variables may be generated using one or more processors in the market analysis system. Alternatively, the first, second, and third variables may be generated in part by an entity that manages (or is associated with) the market analysis system.

In some embodiments, the predetermined percentages $\Delta 1$ and $\Delta 2$ may be the same. Alternatively, the predetermined percentages $\Delta 1$ and $\Delta 2$ may be different. In some cases, each of the predetermined percentages may range from about 5% to about 20% of the first minimum floor price. Alternatively, each of the predetermined percentages may be less than about 5%, or greater than about 20% of the first minimum floor price. In one instance, the second minimum floor price may be set to be 10% above the first minimum floor price (i.e., $\Delta 1=10\%$), and the third minimum floor price may be set to be 10% below the first minimum floor price (i.e., $\Delta 2=10\%$).

In some embodiments, the second minimum floor price and the third minimum floor price may be set to different predetermined percentages above/below the first minimum floor price. In one instance, the first predetermined percentage $\Delta 1$ may be greater than the second predetermined percentage $\Delta 2$. For example, in one instance, the first predetermined percentage $\Delta 1$ may be about 15%, and the second predetermined percentage $\Delta 2$ may be about 12%. Alternatively, the first predetermined percentage $\Delta 1$ may be less than the second predetermined percentage $\Delta 2$. For example, in one instance, the first predetermined percentage $\Delta 1$ may be about 9%, and the second predetermined percentage $\Delta 2$ may be about 16%. Any ratios of the first predetermined percentage $\Delta 1$ to the second predetermined percentage $\Delta 2$ may be contemplated.

The ad exchange server may be configured to offer the available impression to potential buyers (e.g., advertisers or advertising networks) via an online auction. The buyers may include entities that are associated with, or that manage one or more ad network servers 270. The buyers may submit bids for the available impression to the ad exchange server via the ad network server(s). The ad exchange server may be configured to receive bid data from a plurality of buyers, and process the bid data based on the auction criteria set by the market analysis system. For example, the ad exchange server may be configured to process the bid data based on the first minimum floor price, second minimum floor price, and/or third minimum floor price as defined by the first, second, and third variables.

In some embodiments, available ad impressions may be segmented into two or more categories. The two or more categories may comprise, for example, (1) device types and (2) geographical regions in which the ad impressions are displayed to a plurality of end users. In some cases, the device types may include (i) mobile devices and (ii) desktop personal computers sub-categories. Each of the geographical regions may comprise one or more countries. For example, in some embodiments, the ad impressions may be segmented into a first category and a second category. The first category may be classified by device type (e.g., desktop and non-desktop). The second category may be classified by country tiers comprising a plurality of tiers. In some embodiments, the countries may be grouped based on ad profitability level. For example, tier 1 may include a first group of countries in which publisher profits are high, and tier 2 may include a second group of countries in which publisher profits are lower. The ad profitability level in each country may depend on numerous factors, for example the success of an advertiser's ad campaign, the amounts that advertisers are willing to pay for ad impressions, the size of the consumer base, the consumers' preferences, etc. The grouping of countries into different tiers by ad profitability level can also allow advertisers to focus/adjust their advertising efforts and budget for different countries. As an example, tier 1 may include a group of countries comprising the United States, Australia, Singapore, Canada, United Kingdom, Switzerland, and New Zealand. As another example, tier 2 may include a group of countries comprising the Netherlands, Bermuda, Hong Kong, Norway, Germany, France, United Arab Emirates, Belgium, Japan, Qatar, Austria, Sweden, Lichtenstein, Finland, Kiribati, Nauru, Malta, Mauritania, Luxembourg, Iceland, Mali, Puerto Rico, Spain, Ireland, Monaco, Denmark, and Guam. As a further example, tier 3 may include a group of countries comprising Cyprus, South Africa, Iran, Lesotho, Israel, Kuwait, Malaysia, Saudi Arabia, Cayman Islands, Tajikistan, Bahrain, Yemen, Eritrea, Laos, St Lucia, Anguilla, Haiti, Micronesia, U.S. Virgin Islands, Italy, Czech Republic, Hungary, Bahamas, St. Kitts & Nevis, American Samoa, Cook Islands, Somalia, Thailand, South Korea, Jordan, Mexico, Panama, British Virgin Islands, China, Slovakia, Peru, Latvia, Chile, Jamaica, India, Estonia, Brazil, Poland, Portugal, Brunei, Lithuania, Romania, Argentina, Slovenia, Croatia, and Greece. Additionally, tier 4 may include one or more countries that are not in any of tiers 1, 2, and 3. Any number of country tiers may be provided. It should be noted that the countries listed in the above tiers are merely exemplary, and that the tiers can be modified in different ways. For example, one or more countries may be added to or omitted from a tier, or moved from one tier to another tier depending on changes in ad profitability level.

In some embodiments, the segmentation categories may not include an age, gender, online viewing preference, demographic information, geographic location, socioeconomic data (income, nationality, race), that is specific to each of the plurality of users.

The ad exchange server can process auction bids based on (1) the criteria (e.g., first/second/third minimum floor prices) set by the market analysis system, and (2) segmented categories. After the ad exchange server has determined a winning bid from the bid data, the ad exchange server may transmit the auction results to one or more of the ad network servers 270. In some instances, the ad exchange server may transmit the auction results to all ad network servers that had submitted bids for the auction. In other instances, the ad exchange server may transmit the auction results only to the ad network server that had submitted the winning bid. In addition, the ad exchange server may transmit the auction results back to the market analysis system, for further analysis by the market analysis system as described elsewhere herein. The market analysis system may be configured to analyze the auction results to determine and/or adjust the minimum floor prices, in order to optimize the overall earnings for an ad placement. For the example, the profits of the ad placement can be optimized by extracting the maximum value (i.e., price that the market is willing to pay at that given instance) for the ad placement.

Upon receiving the auction results, the ad network server that submitted the winning bid may provide instructions to an ad server 240 to deliver the ad on the webpage to the user. An ad impression is counted by the ad server when the ad is fully (successfully) loaded on the webpage in the browser of the user device. The ad server may be further configured to transmit the successful ad impression to the market analysis system.

To evaluate real market movements, an ad unit may be tested at different floor prices between different ad unit levels. For example, referring to parts A and B of FIG. 3, an ad unit may be tested between the top level and the middle level during a specific time period having a length of time T1. The ad unit may be tested at the first minimum floor price P1 for a first predetermined amount of time corresponding to x % of T1. The ad unit may also be tested at the second minimum floor price P2 for a second predetermined amount of time corresponding to y % of T1. The ad unit may also be tested at the third minimum floor price P3 for a third predetermined amount of time corresponding to z % of T1.

In some embodiments, x may be greater than each of y and z. Additionally, y and z may be equal or different. For example, in one instance, y may be greater than z. Alternatively, y may be less than z. Any ratios of x, y, and z may be contemplated.

In some cases, the first predetermined amount of time may be about 90% of the time period T1, during which auctions for ad impressions may be processed based on the first minimum floor price. In some cases, the second predetermined amount of time may be about 5% of the time period T1, during which auctions for ad impressions may be processed based on the second minimum floor price. In some cases, the third predetermined amount of time may be about 5% of the time period T1, during which auctions for ad impressions may be processed based on the third minimum floor price. The second and third variables (associated with the second and third minimum floor prices) can be used in conjunction with the first variable (associated with the first minimum floor price) to test for real market movements, to determine whether the market is going upwards or going downwards.

The testing at different floor prices can be performed in a random order or a pseudorandom order within a time period. For example, as shown in part B of FIG. 3, the ad unit can be tested at random at different floor prices between levels within the time period T1, in accordance with a predetermined temporal distribution (e.g., 5%/5%/90% as described above). In some alternative embodiments, the ad unit can be tested in a predetermined order between levels within the time period T1. Any order or sequence of testing at different floor prices between different ad unit levels may be contemplated.

In some embodiments, a plurality of ad impressions may be provided to a plurality of end users over different time periods. Within each time period, the ad unit can be tested at different floor prices between different ad unit levels, as described above. A plurality of time periods may be distributed over a day, a week, or a month. In some embodiments, a time period may be a 6-hour block within a day. Sequential time periods may correspond to adjacent 6-hour time blocks. For example, a first time period may be from 12 am to 6 am, a second time period may be from 6 am to 12 pm, a third time period may be from 12 pm to 6 pm, and a fourth time period may be from 6 pm to 12 am. Each time period may be referred to interchangeably herein as a channel. For example, the first time period may correspond to channel 1, the second time period may correspond to channel 2, the third time period may correspond to channel 3, and the fourth time period may correspond to channel 4. The market analysis system may be configured to receive auction results of the different channels, and analyze the auction results to adjust the minimum floor prices to optimize publisher profits during and across different time periods.

FIG. 4A shows an example of an available ad impression on a desktop computer that is being tested at different floor prices within a specific time period, in accordance with some embodiments. A user device 410-1 may include a computer-implemented display 412-1 that is configured to display a webpage 432-1 within a web browser. In the example of FIG. 4A, the user device 410-1 may be a desktop computer. The webpage may include an ad code for executing an available ad impression 452. The ad unit may be tested at the first minimum floor price P1 for about 90% of the time during the time period. Additionally, the ad unit may be tested at the second minimum floor price P2 for about 5% of the time during the time period. Likewise, the ad unit may be tested at the third minimum floor price P3 for about 5% of the time during the time period. As previously described, the second and third variables (associated with the second and third minimum floor prices) can be used in conjunction with the first variable (associated with the first minimum floor price) to test for real market movements, specifically to determine whether the market is going upwards or going downwards.

Figure 4B:
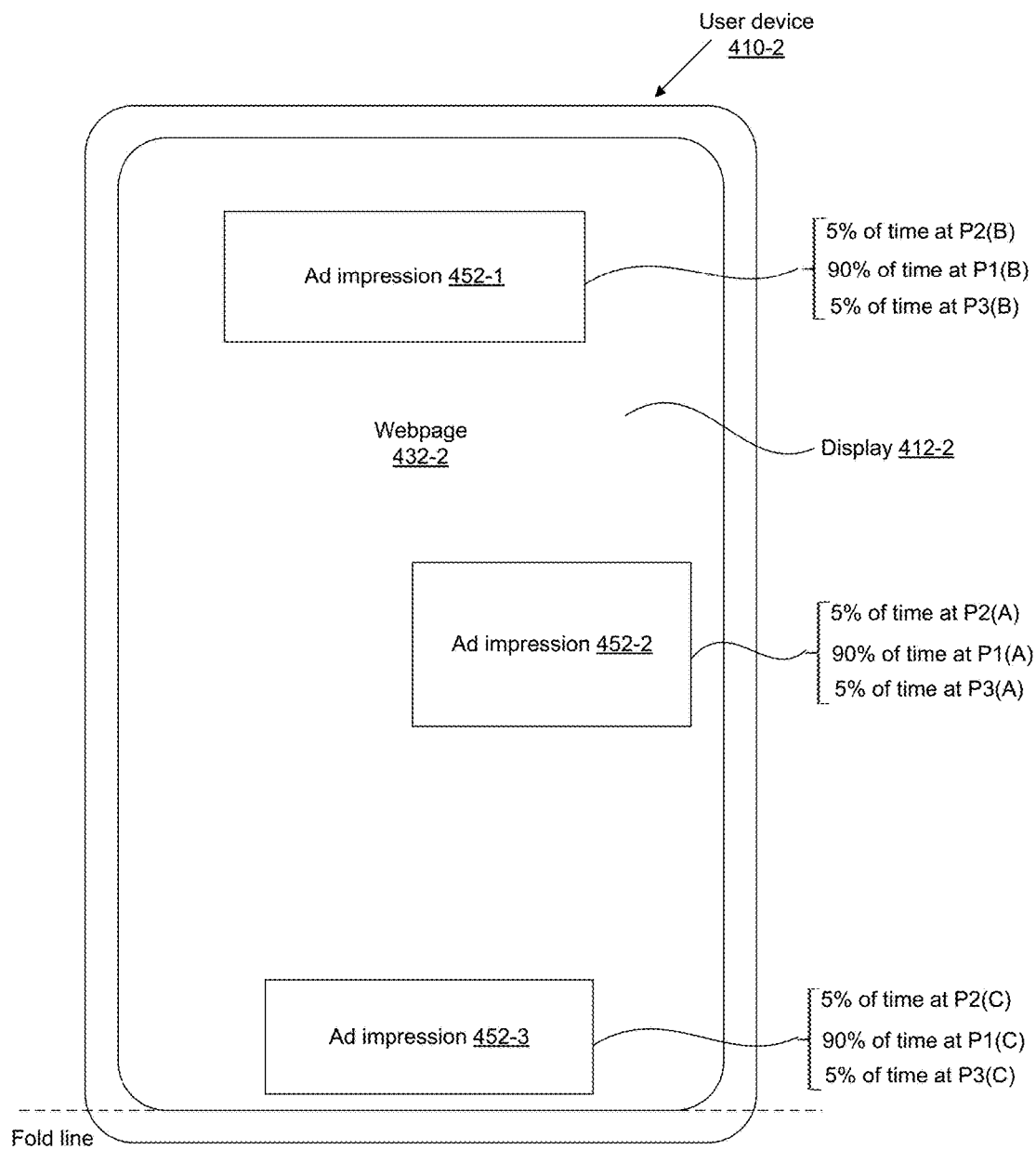
FIG. 4B shows an example of available ad impressions on different areas of a mobile device that are being tested at different floor prices, in accordance with some embodiments.

FIG. 4B shows an example of available ad impressions on different areas of a mobile device that are being tested at different floor prices within a specific time period, in accordance with some embodiments. A user device 410-2 may include a computer-implemented display 412-2 that is configured to display a webpage 432-2 within a web browser. In the example of FIG. 4B, the user device 410-2 may be a mobile device (e.g., a smartphone or a tablet). The webpage may include an ad code for executing a plurality of available ad impressions 452-1, 452-2, and 452-3. The available ad impressions may be provided on different display areas. The different display areas may include a top area, a central area, a bottom area, and/or peripheral area of the browser screen. The different display areas may be provided in any shape and/or size. In some instances, a display area may be rectangle-shaped, while another display area may be any oval-shaped. Additionally, different display areas can have different sizes. The available ad impressions can be tested at different floor prices between different ad unit levels, as described below In FIG. 4B, the webpage may include an ad code for executing the available ad impression 452-2. The ad impression 452-2 may be provided as a top Multi-Purpose Unit (MPU) loading. In the top MPU loading, the ad unit may be loaded at a position that is more than 50% above the fold (ATF) on the webpage. The ad unit may be tested at a first minimum floor price P1(A) for about 90% of the time during a time period). Additionally, the ad unit may be tested at a second minimum floor price P2(A) for about 5% of the time during the time period. Likewise, the ad unit may be tested at a third minimum floor price P3(A) for about 5% of the time during the time period. The second and third variables (associated with the second and third minimum floor prices P2(A) and P3(A)) can be used in conjunction with the first variable (associated with the first minimum floor price P1(A)) to test for real market movements, in order to determine whether the market is going upwards or going downwards for the pricing of the ad impression 452-2.

The webpage may also include another ad code for executing the available ad impression 452-1. The ad impression 452-1 may be provided as a leaderboard loading. In the leaderboard loading, the ad unit may be loaded near the top of the displayable area on the webpage. The ad unit may be tested at a first minimum floor price P1(B) for about 90% of the time during the time period. Additionally, the ad unit may be tested at a second minimum floor price P2(B) for about 5% of the time during the time period. Likewise, the ad unit may be tested at a third minimum floor price P3(B) for about 5% of the time during the time period. The second and third variables (associated with the second and third minimum floor prices P2(B) and P3(B)) can be used in conjunction with the first variable (associated with the first minimum floor price P1(B)) to test for real market movements, in order to determine whether the market is going upwards or going downwards for the pricing of the ad impression 452-1.

Similarly, the webpage may further include another ad code for executing the available ad impression 452-3. The ad impression 452-3 may be provided as a mid Multi-Purpose Unit (MPU) loading. In the mid MPU loading, the ad unit may be loaded at a position that is less than 50% above the fold (ATF) on a webpage. The ad unit may be tested at a first minimum floor price P1(C) for about 90% of the time during the time period. Additionally, the ad unit may be tested at a second minimum floor price P2(C) for about 5% of the time during the time period. Likewise, the ad unit may be tested at a third minimum floor price P3(C) for about 5% of the time during the time period. The second and third variables (associated with the second and third minimum floor prices P2(C) and P3(C)) can be used in conjunction with the first variable (associated with the first minimum floor price P1(C)) to test for real market movements, in order to determine whether the market is going upwards or going downwards for the pricing of the ad impression 452-3. In the example of FIG. 4B, some of the floor prices P1(A), P2(A), P3(A), P1(B), P2(B), P3(B), P1(C), P2(C), and P3(C) may be the same or different from one another. In some cases, the group of floor prices P1(A), P2(A), P3(A) may be higher than the group of floor prices P1(B), P2(B), P3(B). The group of floor prices P1(B), P2(B), P3(B) may be higher than the group of floor prices P1(C), P2(C), P3(C).

Accordingly, the embodiment in FIG. 4B can be used to maximize publisher earnings by optimizing the entire displayable area ("real estate") of different ad placements, without focusing on a single impression floor price. For example, the overall earnings of an ad placement for each ad unit can be maximized by dynamically adjusting minimum floor prices between ad unit levels within and across different time periods based on real-time market movements. It should be appreciated that the examples of FIGS. 4A and 4B can be modified in various ways. For example, the embodiment of FIG. 4A can include ad placements for ad units on different displayable areas, whereby each ad unit is tested at different floor prices between levels within a time period.

Figure 5:
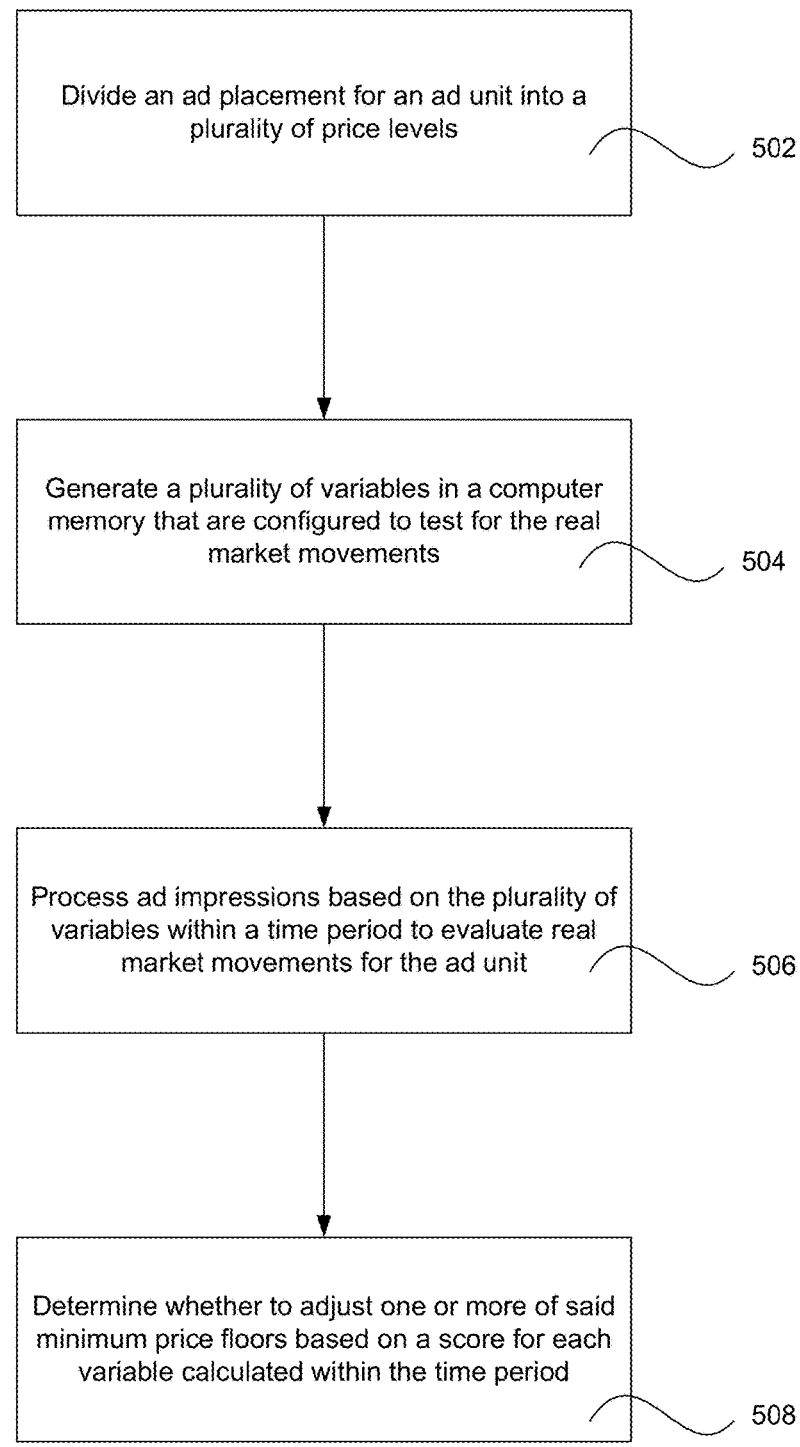
FIG. 5 illustrates a method for optimizing publisher profits in online advertising based on real market movements between ad unit levels, in accordance with some embodiments.

FIG. 5 illustrates a method for optimizing publisher profits in online advertising based on real market movements, in accordance with some embodiments. First, the market analysis system may divide an ad placement for an ad unit into a plurality of price levels (502). The ad unit levels may comprise a middle level having a first price range, a top level having a second price range, and a bottom level having a third price range. A plurality of minimum floor prices may be provided between ad unit levels, for example as previously described in part A of FIG. 3. The different floor prices may be used to test market movements for an ad unit between levels (to determine whether advertisers are willing to pay more or pay less for a given ad unit).

Next, the market analysis system may generate a plurality of variables that are configured to test for the real market movements (504). The plurality of variables may comprise (1) a first variable in which a first minimum floor price is used as a baseline, (2) a second variable in which a second minimum floor price is set to be a predetermined percentage above the first minimum floor price, and (3) a third variable in which a third minimum floor price is set to be the predetermined percentage below the first minimum floor price. The plurality of variables may be stored in a memory or database located with the market analysis system, or remote from the market analysis system.

Next, the market analysis system may process ad impressions based on the plurality of variables within a time period to evaluate real market movements for the ad unit (506). In some cases, multiple ad impressions can also be delivered to multiple users (on multiple user devices) at any time instance. In some cases, multiple ad impressions can be delivered to a single webpage and presented for bidding by multiple buyers (e.g., advertising networks) in online auctions. The market analysis system may be configured to analyze the auction results for different ad impressions that are tested at different floor prices within a time period.

Next, the market analysis system may determine whether to adjust one or more the first, second, or third minimum floor prices based on a score for each variable calculated within the time period (508). For example, the market analysis system may dynamically adjust one or more the first, second, or third minimum floor prices within the time period to optimize the publisher profits for an ad call. In particular, the market analysis system can continuously and/or periodically adjust (e.g., dynamically and in real-time) one or more of the first, second, or third minimum floor prices based on the scores for the variables within the time period. The scores may be indicative of market movements that reflect supply and demand patterns for different ad placements/ad impressions.

The market analysis system may be configured to calculate a score for each variable based on a plurality of metrics obtained for each variable during the time period. In some embodiments, the score for each variable may be calculated by a third party entity that is different from an entity that administers the publisher content server and/or the ad network server(s). The third party entity may be, for example, a company that provides and/or manages the market analysis system.

The plurality of metrics may include: (i) number of ad requests, (ii) number of matched requests, (iii) number of fill impressions, (iv) fill rate, (v) cost per mille (CPM), and/or (vi) earnings. The number of ad requests may be the total number of ad requests (or ad calls) received within the time period. The number of matched requests may be the total number of ad requests that received successful bids from buyers (i.e., the ad requests that were "matched" with buyers). The fill rate corresponds to the ratio of the number of matched requests to the total number of ad requests. The cost per mille (CPM) is a measure of ad performance, and indicates a cost (or price) of showing an ad one thousand times. The CPM is also a measure of revenue that the publisher can expect to receive from an advertising network based on the number of impressions, or page views, of the webpage content with the ad. The earnings of the publisher can be calculated by multiplying the CPM with the number of matched requests and dividing by one thousand.

In some embodiments, the market analysis system may be configured to calculate the score for each variable without evaluating metrics such as an age, gender, online viewing preference, demographic information, geographic location, socioeconomic data (income, nationality, race), user identity, of the plurality of users, and that is specific to each user.

Figure 6:
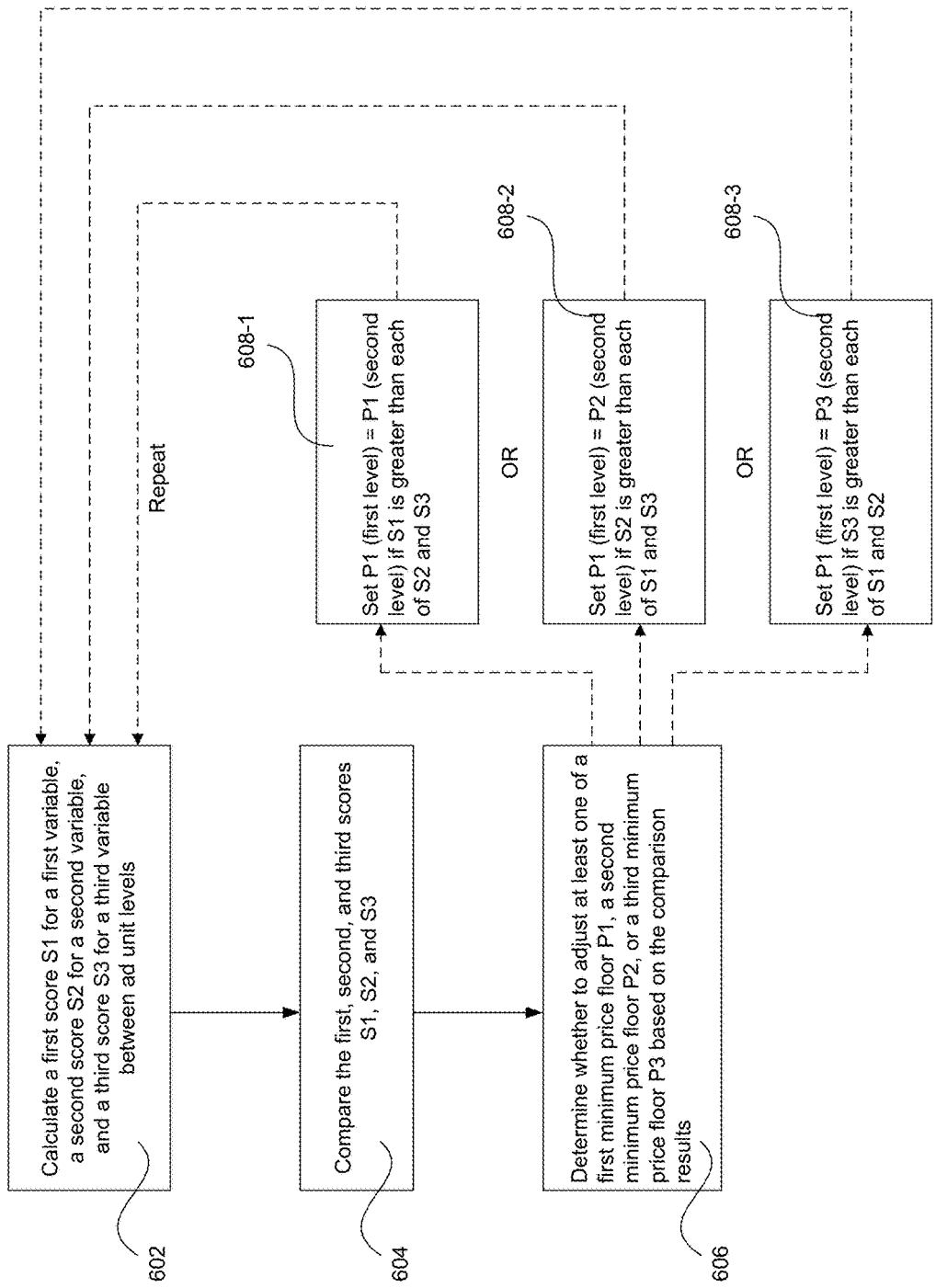
FIG. 6 illustrates a method for determining whether to adjust one or more of the first minimum floor price, second minimum floor price, or third minimum floor price based on the scores calculated for a first, second, and third variables, in accordance with some embodiments.

FIG. 6 illustrates a method for determining whether to adjust one or more of the first minimum floor price, second minimum floor price, or third minimum floor price based on the scores calculated for the first, second, and third variables, in accordance with some embodiments. Referring to FIG. 6, the market analysis system may be configured to calculate the score for each variable based on (i) the earnings at a first ad unit level and a second ad unit level, and (ii) the number of ad requests at the first ad unit level. The second ad unit level may be below the first ad unit level. In some embodiments, the market analysis system may calculate a first score S1 for the first variable, a second score S2 for the second variable, and a third score S3 for the third variable (602). The first score for the first variable may be calculated by (a) summing the earnings at the first minimum floor price at the first ad unit level and the second ad unit level, and (b) dividing the earnings by the number of ad requests at the first minimum floor price at the first ad unit level. Similarly, the second score for the second variable may be calculated by (a) summing the earnings at the second minimum floor price at the first ad unit level and the second ad unit level, and (b) dividing the earnings by the number of ad requests at the second minimum floor price at the first ad unit level. Likewise, the third score for the third variable may be calculated by (a) summing the earnings at the third minimum floor price at the first ad unit level and the second ad unit level, and (b) dividing the earnings by the number of ad requests at the third minimum floor price at the first ad unit level.

Next, the market analysis system may be configured to compare the first score, the second score, and the third score (604). The market analysis system may further determine whether to adjust at least one of the first minimum floor price, second minimum floor price, or third minimum floor price at the first ad unit level based on the comparison results (606). The comparison may include determining which of the first score, second score, and third score has a highest value.

In some embodiments, the market analysis system may adjust the first minimum floor price at the first ad unit level to correspond to the first minimum floor price at the second ad unit level if the first score is higher than each of the second score and third score (608-1). Alternatively, the market analysis system may adjust the first minimum floor price at the first ad unit level to correspond to the second minimum floor price at the second ad unit level when the second score is higher than each of the first score and third score (608-2). Conversely, the market analysis system may adjust the first minimum floor price at the first ad unit level to correspond to the third minimum floor price at the second ad unit level when the third score is higher than each of the first score and second score (608-3).

The above-described sequence of steps in FIG. 6 may be repeated for a plurality of ad impressions during a specific time period by testing at different floor prices between levels. Accordingly, the optimal floor prices at a current ad unit level can be determined based on the scores for the variables.

Tables 1A and 1B below illustrate an example of how the scores for the variables are calculated by applying and testing floor prices for different levels of an ad unit. The market analysis system may be configured to execute a "surge" algorithm provided through a software code that is implementable on a computer or a server. The market analysis system can execute the algorithm in order to determine the best floor price for an unspecified level and maximize overall earnings for that level. Specifically, the market analysis system can determine the best floor price for the unspecified level by evaluating one or more levels below that unspecified level. For example, referring to Table 1A, ad requests at a first level (L1) may be allocated and tested at different minimum floor prices. For L1, the market analysis system may be configured to send the following ad requests to the ad exchange server: 99802 ad requests to be processed based on the first minimum floor price, 5041 ad requests to be processed based on the second minimum floor price, and 5009 ad requests to be processed based on the third minimum floor price. The ad exchange server may be configured to receive and process real-time bids on the set of auction criteria provided by the market analysis system. In one example, 14270 out of the 99802 ad requests may at least match the first minimum floor price; 506 out of the 5041 ad requests may at least match the second minimum floor price; and 841 out of the 5009 ad requests may at least match the third minimum floor price. Accordingly, the fill rate for the ad requests at the first minimum floor price may be 14.3%, the fill rate for the ad requests at the second minimum floor price may be 10.04%, and the fill rate for the ad requests at the third minimum floor price may be 16.79%. Out of the 14270 matched requests at the first minimum floor price, 13363 may realize into ad impressions. For example, out of the 506 matched requests at the second minimum floor price, 476 may realize into ad impressions. Out of the 841 matched requests at the third minimum floor price, 801 may realize into ad impressions. Accordingly, the CPMs at the first, second, and third minimum floor prices may be $1.05, $1.18, and $0.87, respectively. The earnings at the first, second, and third minimum floor prices may be $14.94, $0.60, and $0.73, respectively.

As shown in Table 1A, not all of the impressions for L1 may be filled at the end of the first auction. Also, the data obtained for L1 alone is not sufficient for extracting market movements to determine the best floor price for L1. In order to find the best floor price for L1, the market analysis system is configured to evaluate a next level L2 below L1. The data captured in L2 can be used to provide feedback to the market analysis system (or "surge" algorithm) to determine the best floor price in L1, and ensure that ad earnings are not lost. For L2, the market analysis system may be configured to send the following ad requests to the ad exchange server: 80328 ad requests to be processed based on the first minimum floor price, 4205 ad requests to be processed based on the second minimum floor price, and 3925 ad requests to be processed based on the third minimum floor price. It should be noted that the number of ad requests for L2 need not be equal to the available impressions from L1 that are not filled. This is because some of the available impressions from L1 may be lost due to time elapsed after the first auction. The metrics for the matched requests, fill rate, number of impressions, CPM, and earnings for L2 can be obtained similar to those for L1. As mentioned above, the data captured in L2 can be used to provide feedback to the market analysis system (or "surge" algorithm) to determine the best floor price in L1, as shown in Table 1B.

Table 1B shows the combined earnings for L1 and L2, the combined effective CPM (e-CPM), and the scores calculated for the different variables by the market analysis system. The combined earnings at each floor price may be obtained by summing the corresponding earnings for L1 and L2. The combined e-CPM values can be calculated based on the combined earnings and the total number of corresponding matched requests for L1 and L2. However, the combined e-CPM values often do not account for discrepancies between the number of matched requests and the number of ad impressions. Additionally, the combined e-CPM values may not adequately account for the fill rates.

The market analysis system according to various embodiments of the present disclosure can generate scores for the different variables. Market movements/behavior for online ad pricing can be tracked based on those scores. Unlike conventional e-CPM values, the scores calculated by the market analysis system can account for discrepancies (between matched requests and ad impressions) as well as fill rates. As shown in Table 1B, the score for the first variable is 0.22, which is greater than each of the score for the second variable (0.19) and third variable (0.20). Based on the scores, the market analysis system may determine that the best floor price for L1 is for it to remain the same. In another embodiment (not shown), the score for the second variable may be greater than each of the score for the first variable and third variable, and thus the market analysis system may determine that the best floor price for L1 is for it to go up. In yet another embodiment (not shown), the score for the third variable may be greater than each of the score for the first variable and second variable, and thus the market analysis system may determine that the best floor price for L1 is for it to go down. The above-described market scenarios are further described in detail with respect to FIGS. 7, 8, 9, 10, 11, and 12.

TABLE 1A

| Level | Variable | Ad Requests | Matched Requests | Fill | Impressions | CPM | Earnings |
|---|---|---|---|---|---|---|---|
| L1 | Third | 5,009 | 841 | 16.79% | 801 | $ 0.87 | $ 0.73 |
|  | Second | 5,041 | 506 | 10.04% | 476 | $ 1.18 | $ 0.60 |
|  | First | 99,802 | 14,270 | 14.30% | 13,363 | $ 1.05 | $ 14.94 |
| L2 | Third | 3,925 | 895 | 22.80% | 904 | $ 0.33 | $ 0.29 |
|  | Second | 4,205 | 1,064 | 25.30% | 1,151 | $ 0.35 | $ 0.37 |
|  | First | 80,328 | 19,803 | 24.65% | 20,480 | $ 0.34 | $ 6.71 |

TABLE 1B

| Summary | Combined earnings | Combined eCPM | Score |
|---|---|---|---|
| Third variable | $ 1.02 | 0.59 | 0.20 |
| Second variable | $ 0.97 | 0.62 | 0.19 |
| First variable | $21.65 | 0.64 | 0.22 |

FIGS. 7, 8, 9, 10, 11, and 12 illustrate various scenarios for adjusting minimum floor prices based on the scores calculated for the variables, in accordance with some embodiments. The score for each variable can be plotted on a graph as a function of time over a plurality of time periods. Additionally, the minimum floor price for each variable can be plotted on a graph as a function of time over the plurality of time periods. The graphs can be displayed on a computer-implemented display. A change in the score for each variable, and a change in the minimum floor price for each variable, can be determined from the graphs, as described below. The changes in the scores and the minimum floor prices can be used to determine real market movements.

Figure 7:
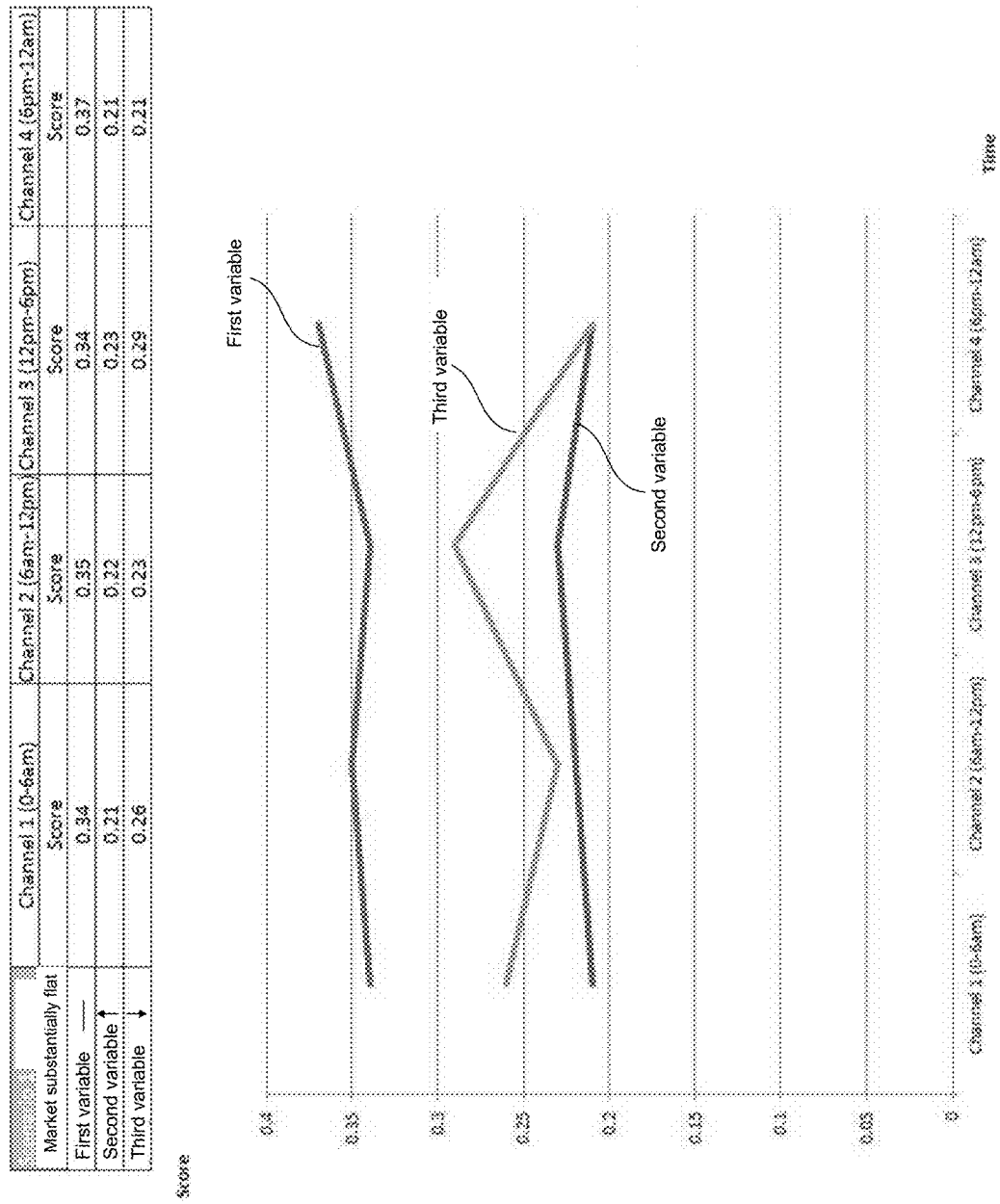
FIG. 7 illustrates a graph of the scores for different variables whereby a first variable is highest across over different time periods, in accordance with some embodiments.
Figure 8:
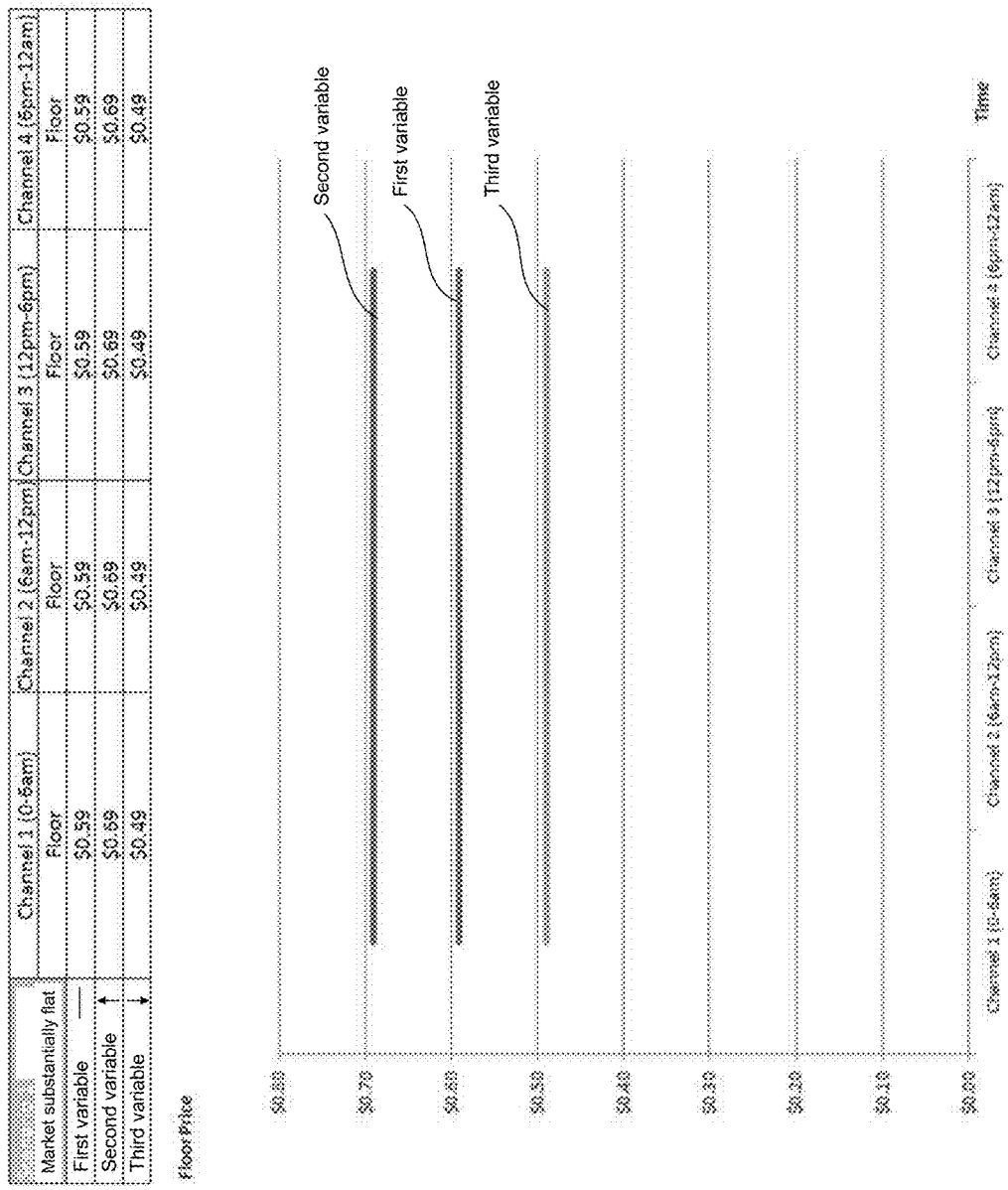
FIG. 8 illustrates a graph in which a first minimum floor price remains substantially the same across different time periods, in accordance with some embodiments.

FIGS. 7 and 8 illustrate an example in which the first minimum floor price remains substantially the same across different time periods (i.e., indicative of little or no market movements). As shown in FIG. 7, the scores for the variables may be calculated over different time periods. Each time period may correspond to a test channel. The channels may include channel 1 (12 am to 6 am), channel 2 (6 am to 12 pm), channel 3 (12 pm to 6 pm), and channel 4 (6 pm to 12 am). The scores may include a first score S1 for the first variable, a second score S2 for the second variable, and a third score S3 for the third variable calculated within each time period.

In the first time period (channel 1), the first score S1 (0.34) is higher than each of the second score S2 (0.21) and the third score S3 (0.26). Accordingly, the first minimum floor price ($0.59) for channel 1 is to be used as the first minimum floor price for the second time period (channel 2). The second minimum floor price and the third minimum floor price for channel 2 may be adjusted based on the first minimum floor price for channel 2. For example, the second minimum floor price for channel 2 may be y $0.10 above the first minimum floor price for channel 2, such that the second minimum floor price is $0.69. Conversely, the third minimum floor price for channel 2 may be y $0.10 below the first minimum floor price for channel 2, such that the third minimum floor price is $0.49.

Similarly, in the second time period (channel 2), the first score S1 (0.35) is higher than each of the second score S2 (0.22) and the third score S3 (0.23). Accordingly, the first minimum floor price ($0.59) for channel 2 is to be used as the first minimum floor price for the third time period (channel 3). The second minimum floor price and the third minimum floor price for channel 3 may be adjusted based on the first minimum floor price for channel 3. For example, the second minimum floor price for channel 3 may be $0.10 above the first minimum floor price for channel 3, such that the second minimum floor price is $0.69. Conversely, the third minimum floor price for channel 3 may be $0.10 below the first minimum floor price for channel 3, such that the third minimum floor price is $0.59.

Likewise, at the end of the third time period (channel 3), the first score S1 (0.34) is higher than each of the second score S2 (0.23) and the third score S3 (0.29). Accordingly, the first minimum floor price ($0.59) for channel 3 is to be used as the first minimum floor price for the fourth time period (channel 4). The second minimum floor price and the third minimum floor price for channel 4 may be adjusted based on the first minimum floor price for channel 4. For example, the second minimum floor price for channel 4 may be $0.10 above the first minimum floor price for channel 4, such that the second minimum floor price is $0.69. Conversely, the third minimum floor price for channel 4 may be $0.10 below the first minimum floor price for channel 4, such that the third minimum floor price is $0.59.

The minimum floor prices in FIG. 7 may be plotted in FIG. 8. As shown in FIG. 8, the first minimum floor price may remain the same across two or more time periods when the first score has the highest value across the two or more time periods. The first variable may be indicative of little to no market movement, such that an ad price for the ad placement substantially tracks the first minimum floor price.

Figure 9:
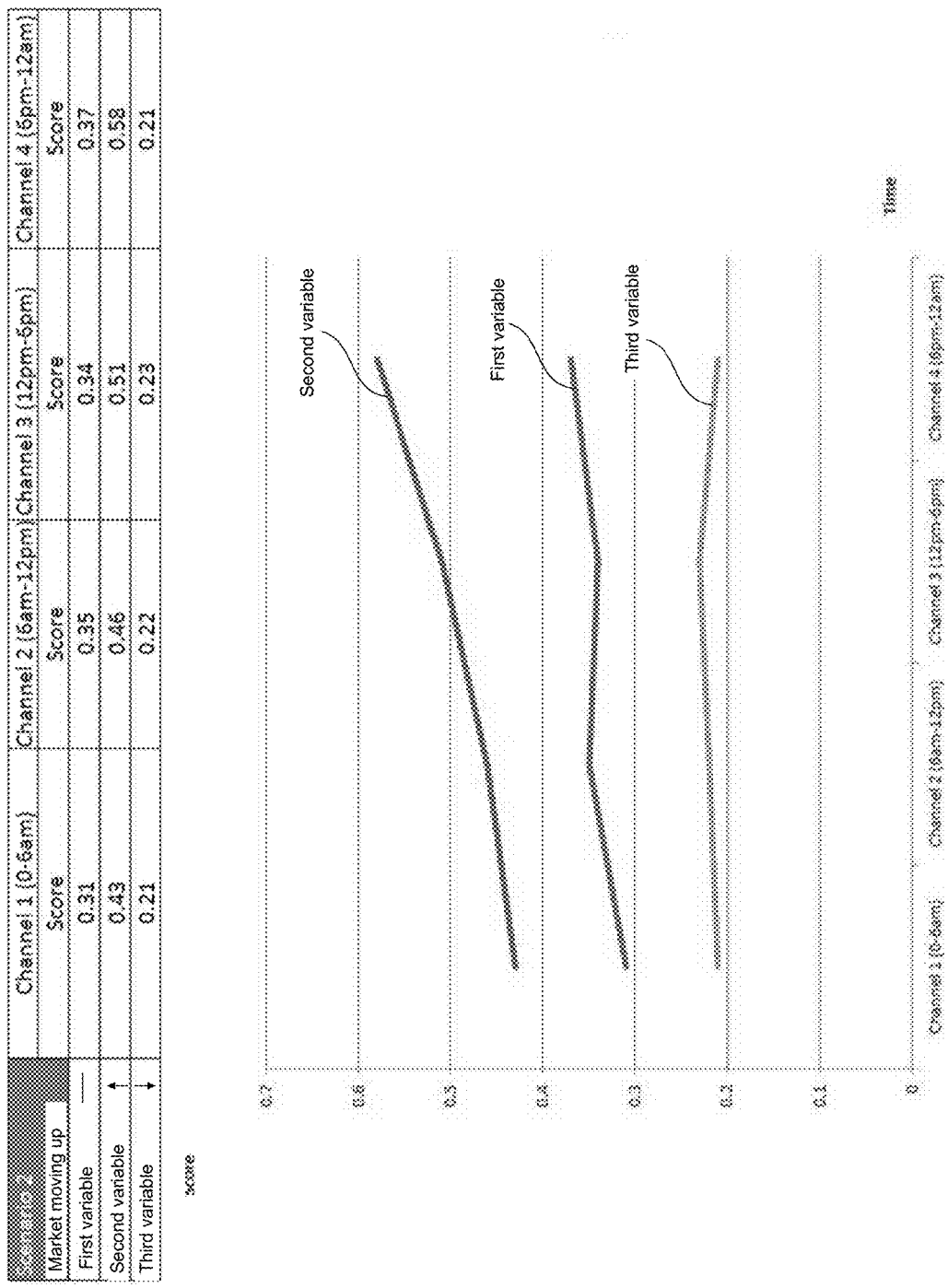
FIG. 9 illustrates a graph of the scores for different variables whereby a second variable is highest across over different time periods, in accordance with some embodiments.
Figure 10:
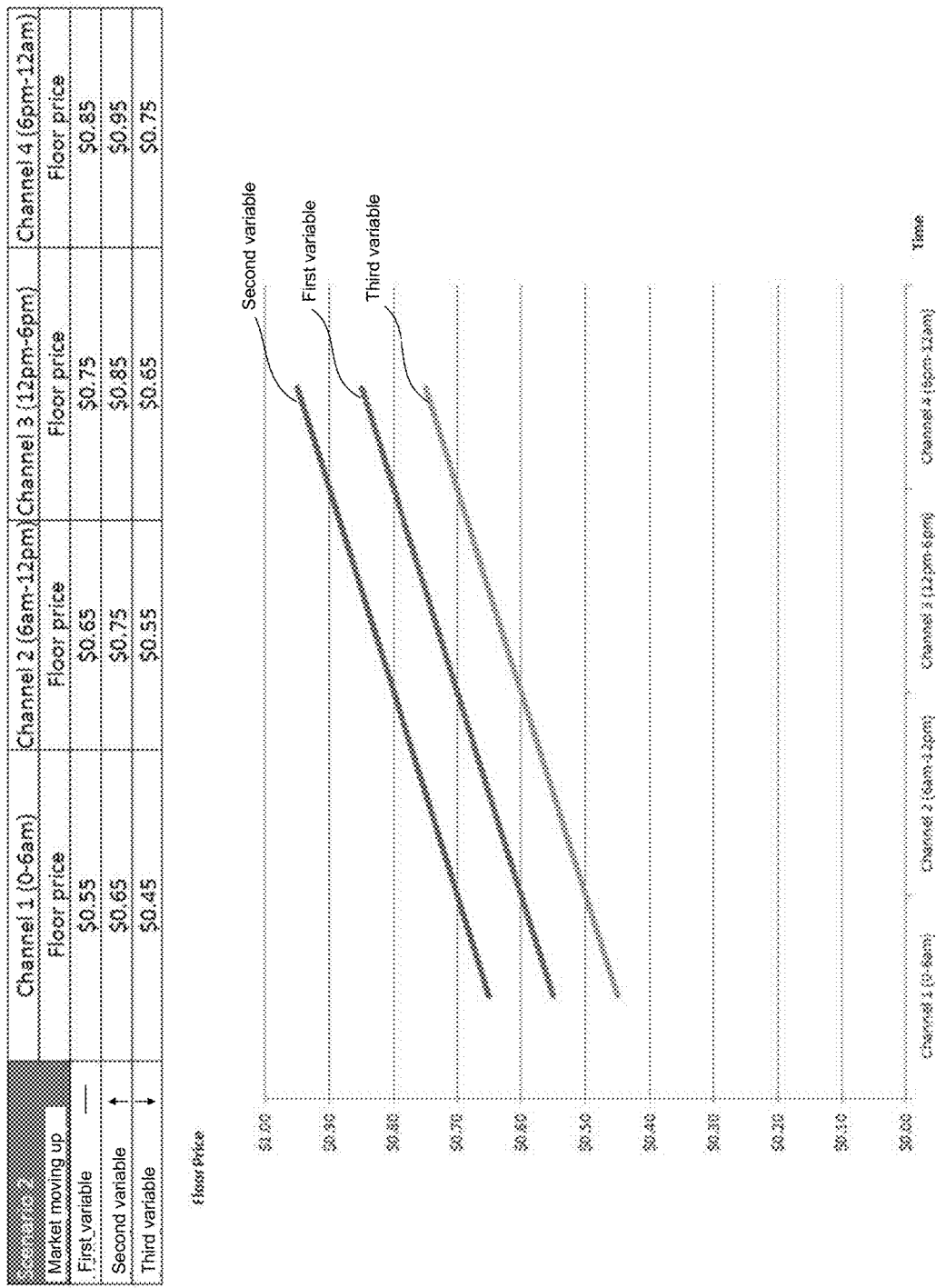
FIG. 10 illustrate a graph in which the first minimum floor price is continuously adjusted upwards across different time periods, in accordance with some embodiments.

FIGS. 9 and 10 illustrate an example in which the first minimum floor price is continuously adjusted upwards across different time periods (i.e., the market is moving upwards). As shown in FIG. 9, the scores for the variables may be calculated over different time periods. Each time period may correspond to a test channel. The channels may include channel 1 (12 am to 6 am), channel 2 (6 am to 12 pm), channel 3 (12 pm to 6 pm), and channel 4 (6 pm to 12 am). The scores may include a first score S1 for the first variable, a second score S2 for the second variable, and a third score S3 for the third variable calculated within each time period.

In the first time period (channel 1), the second score S2 (0.43) is higher than each of the first score S1 (0.31) and the third score S3 (0.21). Accordingly, the second minimum floor price ($0.65) for channel 1 is to be used as the first minimum floor price for the second time period (channel 2). The second minimum floor price and the third minimum floor price for channel 2 may be adjusted based on the first minimum floor price for channel 2. For example, the second minimum floor price for channel 2 may be $0.10 above the first minimum floor price for channel 2, such that the second minimum floor price is $0.75. Conversely, the third minimum floor price for channel 2 may be $0.10 below the first minimum floor price for channel 2, such that the third minimum floor price is $0.55.

In the second time period (channel 2), the second score S2 (0.46) is higher than each of the first score S2 (0.35) and the third score S3 (0.22). Accordingly, the second minimum floor price ($0.75) for channel 2 is to be used as the first minimum floor price for the third time period (channel 3). The second minimum floor price and the third minimum floor price for channel 3 may be adjusted based on the first minimum floor price for channel 3. For example, the second minimum floor price for channel 3 may be $0.10 above the first minimum floor price for channel 3, such that the second minimum floor price is $0.85. Conversely, the third minimum floor price for channel 3 may be $0.10 below the first minimum floor price for channel 3, such that the third minimum floor price is $0.65.

In the third time period (channel 3), the second score S2 (0.51) is higher than each of the first score S2 (0.34) and the third score S3 (0.23). Accordingly, the second minimum floor price ($0.85) for channel 3 is to be used as the first minimum floor price for the fourth time period (channel 4). The second minimum floor price and the third minimum floor price for channel 4 may be adjusted based on the first minimum floor price for channel 4. For example, the second minimum floor price for channel 4 may be $0.10 above the first minimum floor price for channel 4, such that the second minimum floor price is $0.95. Conversely, the third minimum floor price for channel 4 may be $0.10 below the first minimum floor price for channel 4, such that the third minimum floor price is $0.75.

The resulting minimum floor prices in FIG. 9 may be plotted in FIG. 10. As shown in FIG. 10, the first minimum floor price may be continuously adjusted upwards across two or more time periods when the second score has the highest value across the two or more time periods. Accordingly, the second variable may be indicative of an upward market movement, such that an ad price for the ad placement substantially tracks the second minimum floor price.

Figure 11:
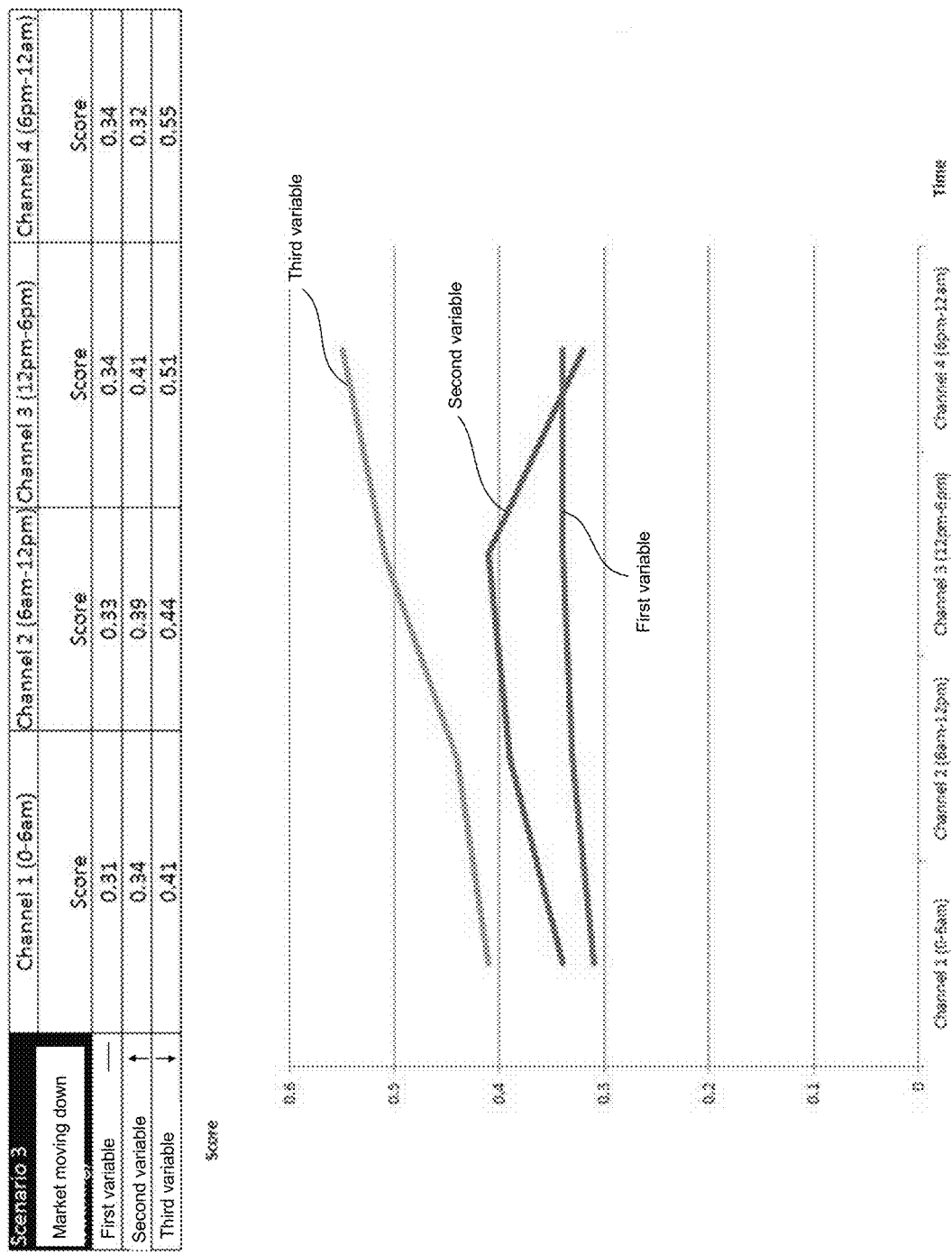
FIG. 11 illustrates a graph of the scores for different variables whereby a third variable is highest across over different time periods, in accordance with some embodiments.
Figure 12:
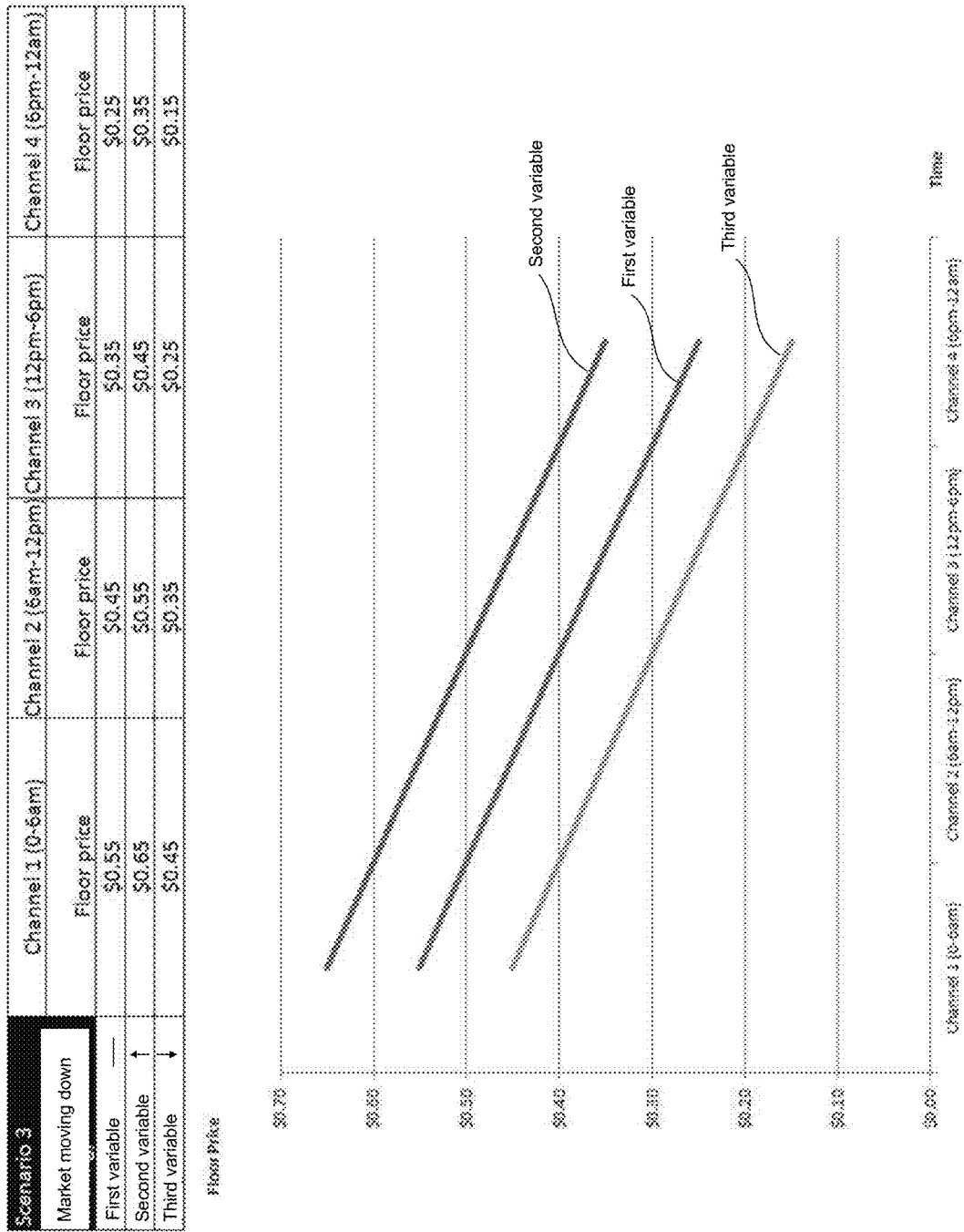
FIG. 12 illustrate a graph in which the first minimum floor price is continuously adjusted downwards across different time periods, in accordance with some embodiments.

FIGS. 11 and 12 illustrate an example in which the first minimum floor price is continuously adjusted downwards across different time periods (i.e., the market is moving downwards). As shown in FIG. 11, the scores for the variables may be calculated over different time periods. Each time period may correspond to a test channel. The channels may include channel 1 (12 am to 6 am), channel 2 (6 am to 12 pm), channel 3 (12 pm to 6 pm), and channel 4 (6 pm to 12 am). The scores may include a first score S1 for the first variable, a second score S2 for the second variable, and a third score S3 for the third variable calculated within each time period.

In the first time period (channel 1), the third score S3 (0.41) is higher than each of the first score S1 (0.31) and the second score S2 (0.21). Accordingly, the third minimum floor price ($0.45) for channel 1 is to be used as the first minimum floor price for the second time period (channel 2). The second minimum floor price and the third minimum floor price for channel 2 may be adjusted based on the first minimum floor price for channel 2. For example, the second minimum floor price for channel 2 may be $0.10 above the first minimum floor price for channel 2, such that the second minimum floor price is $0.55. Conversely, the third minimum floor price for channel 2 may be $0.10 below the first minimum floor price for channel 2, such that the third minimum floor price is $0.35.

In the second time period (channel 2), the third score S3 (0.44) is higher than each of the first score S2 (0.33) and the second score S2 (0.39). Accordingly, the third minimum floor price ($0.35) for channel 2 is to be used as the first minimum floor price for the third time period (channel 3). The second minimum floor price and the third minimum floor price for channel 3 may be adjusted based on the first minimum floor price for channel 3. For example, the second minimum floor price for channel 3 may be $0.10 above the first minimum floor price for channel 3, such that the second minimum floor price is $0.45. Conversely, the third minimum floor price for channel 3 may be $0.10 below the first minimum floor price for channel 3, such that the third minimum floor price is $0.25.

In the third time period (channel 3), the third score S3 (0.51) is higher than each of the first score S2 (0.34) and the second score S2 (0.41). Accordingly, the third minimum floor price ($0.25) for channel 3 is to be used as the first minimum floor price for the fourth time period (channel 4). The second minimum floor price and the third minimum floor price for channel 4 may be adjusted based on the first minimum floor price for channel 4. For example, the second minimum floor price for channel 4 may be $0.10 above the first minimum floor price for channel 4, such that the second minimum floor price is $0.35. Conversely, the third minimum floor price for channel 4 may be $0.10 below the first minimum floor price for channel 4, such that the third minimum floor price is $0.15.

The minimum floor prices in FIG. 11 may be plotted in FIG. 12. As shown in FIG. 12, the first minimum floor price may be continuously adjusted downwards across two or more time periods when the third score has the highest value across the two or more time periods. Accordingly, the third variable may be indicative of a downward market movement, such that an ad price for the ad placement substantially tracks the third minimum floor price.

Figure 13:
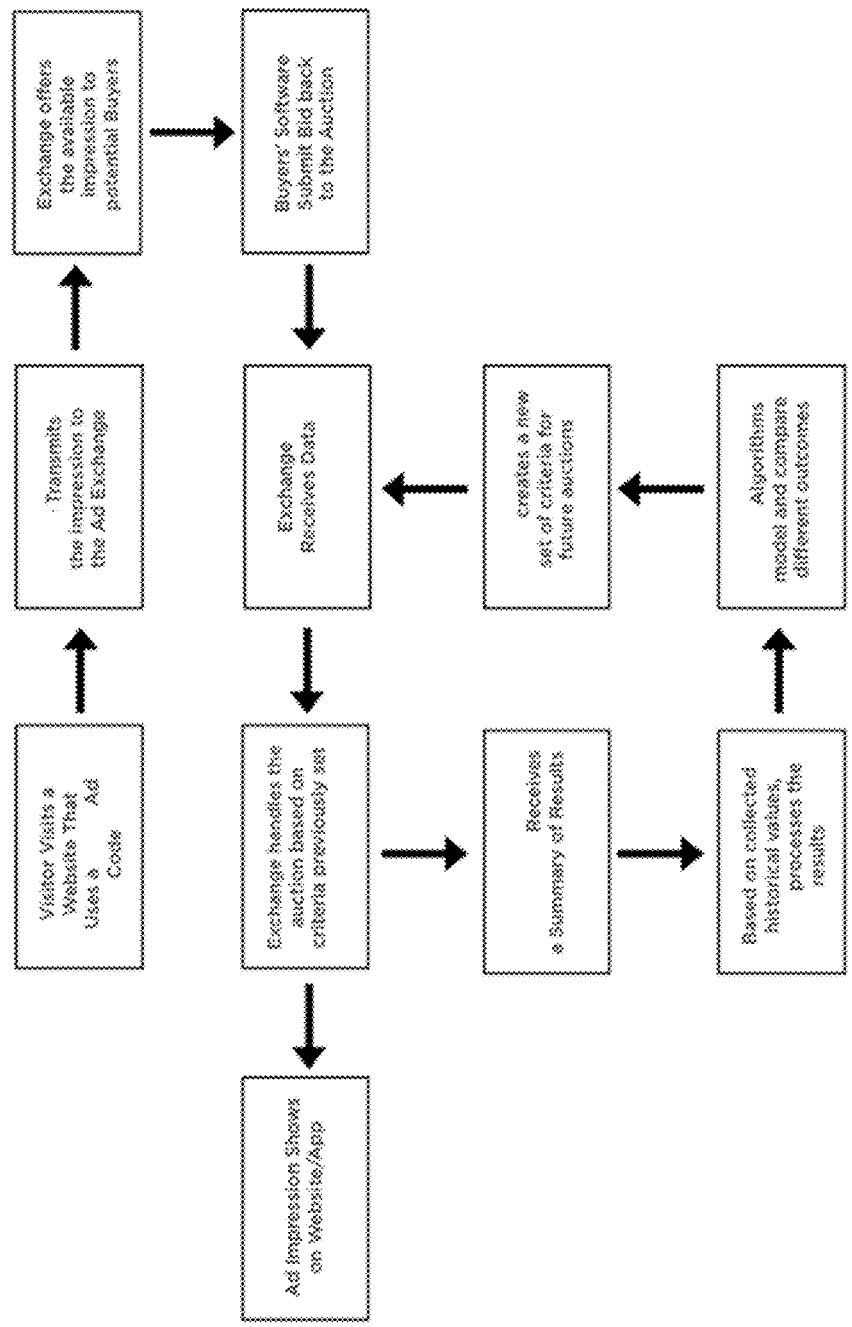
FIG. 13 illustrates a flowchart depicting a method of processing ad requests and optimizing publisher revenue, in accordance with some embodiments.

FIG. 13 illustrates a flowchart depicting a method of processing ad requests and optimizing publisher revenue, in accordance with some embodiments. The method in FIG. 13 can be implemented using one or more of the previously-described embodiments. For example, the method in FIG. 13 can be implemented using the network layout shown in FIG. 2.

Referring to FIG. 13, a visitor (e.g., a user) may visit a website that uses the ad code described elsewhere herein. When the browser on the user device executes the ad code, an ad call (or ad request) is generated. Next, a market analysis system (e.g., market analysis system 250) may transmit an available ad impression to an ad exchange server (e.g., ad exchange server 260). The ad exchange server may offer the available impression to potential buyers (e.g., advertisers and advertising networks) through an online auction. The buyers' software may submit bids for the auction via one or more ad network servers (e.g., ad network servers 270). The ad exchange server may receive the bid data and handle the auction based on a set of auction criteria. The set of auction criteria may be generated and provided by the market analysis system. The set of auction criteria may include a plurality of variables (e.g., first variable, second variable, and third variable) as described elsewhere herein. Available impressions can be tested at different floor prices for different amounts of time within each time period (for example, as described with reference to FIGS. 3, 4A, and 4B). The ad exchange server may filter the bid data based on the auction criteria, and select a winning bid for each ad placement. The buyer (advertising network) that submitted the winning bid may be informed. The ad network server may send instructions to an ad server (e.g., ad server 240) to deliver the "winning" ad on the website. An ad impression is counted when the ad is fully loaded on the website (or a web application). The market analysis system may also receive the auction results from the ad exchange server. In some cases, a summary of the auction results may be generated over time periods, for different variables as described elsewhere herein. The market analysis system may process (analyze) the results based on collected historical data, for example as previously described with reference to FIGS. 5 through 12. Specifically, the market analysis system may execute one or more sets of computer program instructions to calculate the scores for the different variables, and compare the scores in order to determine whether to adjust one or more of the first minimum floor price, second minimum floor price, and/or third minimum floor price, as described elsewhere herein. Next, the market analysis system may generate a new set of criteria for future auctions based on the comparison results, and provide the new set of criteria to the ad exchange server. The ad exchange server may then handle the auctions based on the new set of criteria. The above sequence of steps may be repeated over within and over different time periods, for different ad placements, for different (segmentation) categories, etc. As previously mentioned, the different categories can be segmented by device type (e.g., desktop and non-desktop) and country tiers.

Figure 14:
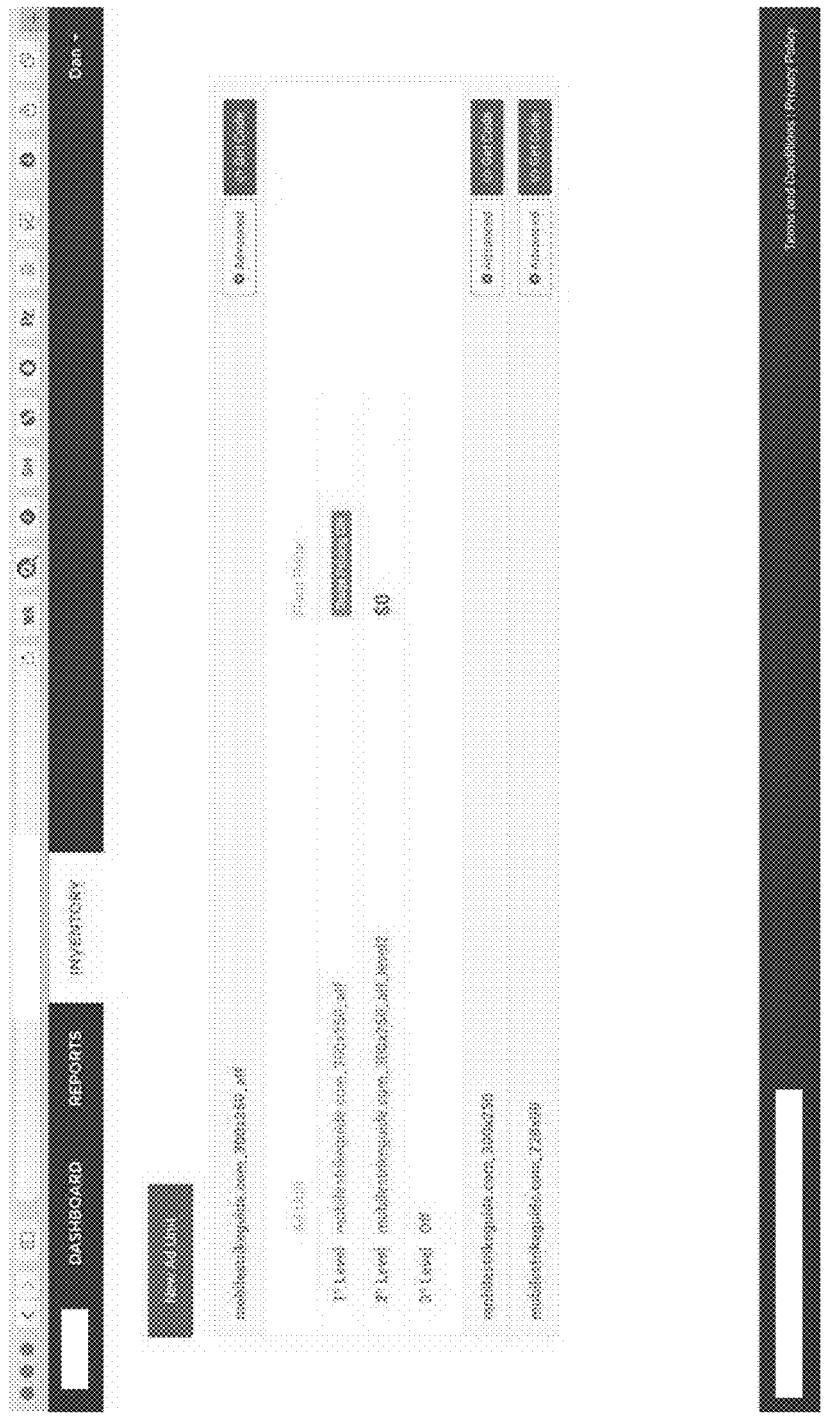
FIGS. 14 and 15 illustrate a portal for managing ad inventory and monitoring ad price market movements, in accordance with some embodiments.
Figure 15:
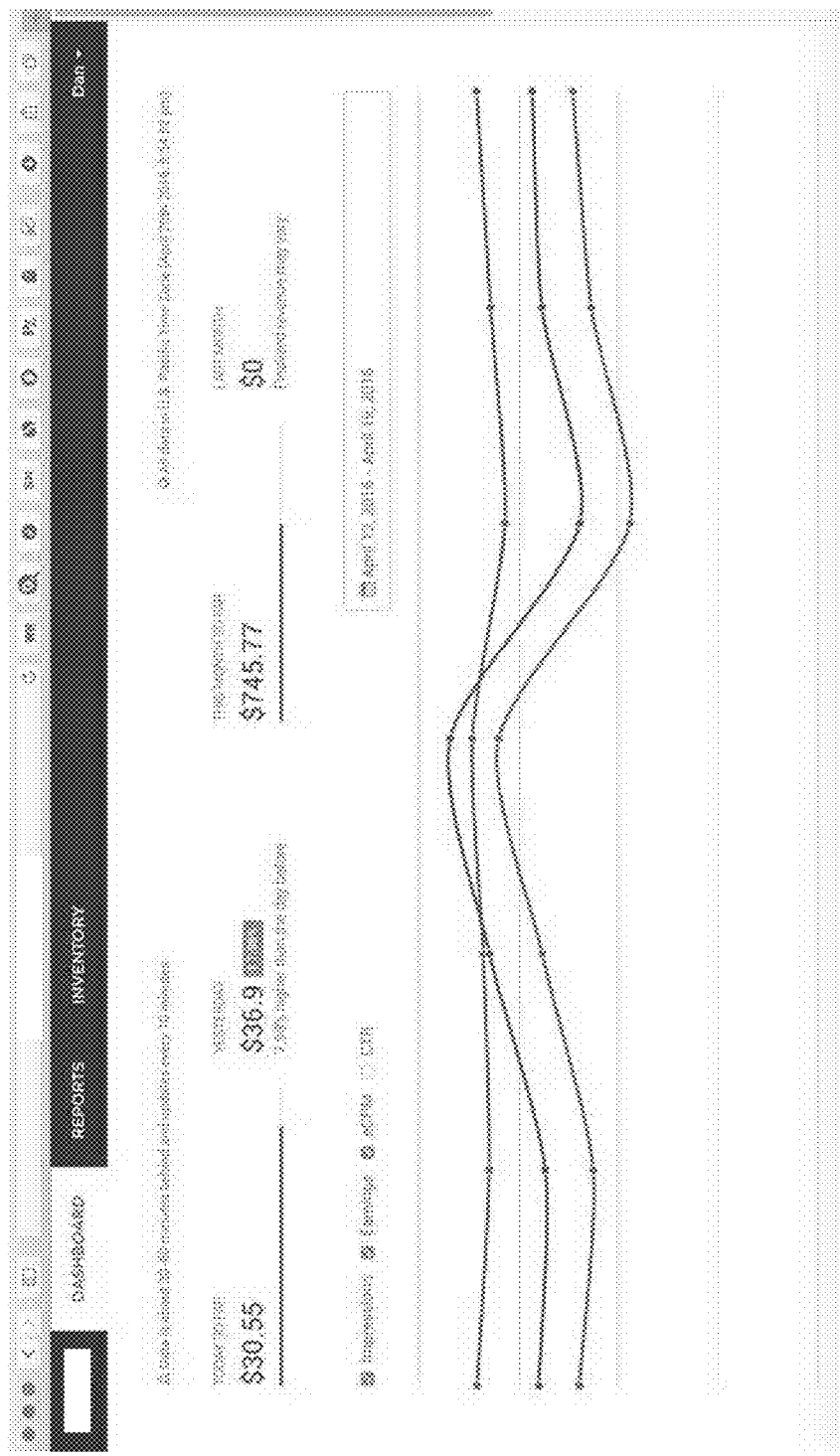

FIGS. 14 and 15 illustrate a portal for managing ad inventory and monitoring ad price market movements, in accordance with some embodiments. The portal can be hosted by a market analysis system, and used by one or more entities. In some cases, an entity may be a publisher. The publisher can view the optimization of ad revenue via the portal (e.g., the dashboard shown in FIG. 15). The portal may be provided through an application programming interface (API). The data contained in the portal can be rendered through a graphical user interface (GUI) on a computing device. A user or entity can also interact with various elements in the portal via the GUI.

Referring to FIG. 14, the inventory for available ad units is shown. The available ad impressions may be shown on a website (e.g., mobilestrikeguide.com), and contain a plurality of ad units. For example, there may be two 300×250 ad units, and a 728×90 ad unit. The 300×250 ad unit is an IAB standard ad unit with dimensions of 300 pixels wide by 250 pixels tall (also known as medium rectangle). The 728×90 ad unit is an IAB standard ad unit with dimensions of 728 pixels wide by 90 pixels tall (also known as leaderboard). The 300×250 ad unit may divided into a plurality of price levels (e.g., level 1, level 2, and level 3). In some cases, level 1 may be indicative of a top price level, level 2 may be indicative of a middle price level, and level 3 may be indicative of a bottom price level. The ad unit can be tested at different floor prices between different levels. In the example of FIG. 14, the floor price for level 1 may be active, the floor price for level 2 may be set to $0, and the floor price for level 3 may be turned off. The auctions for the ad units may be handled (for example, by an ad exchange server) based on the settings for the floor prices, as described elsewhere herein.

FIG. 15 shows a dashboard for tracking ad revenue over a time period, in accordance with some embodiments. A publisher can use the dashboard to track market movements and ad revenue. For example, as shown in FIG. 15, the ad revenue for "today" may be $30.55, and the ad revenue for "yesterday" may be $36.90. An indicator shows that the ad venue for "yesterday" is 7.98% higher than the ad revenue for "today." The ad revenue for the current month may be $745.77, whereas the ad revenue for the previous month may be $0. The plots in FIG. 15 may show the number of impressions, earnings, and e-CPM over a time period (e.g., Apr. 13, 2016 to Apr. 19, 2016).

In some embodiments, one role of the market analysis system may be to help publishers optimize their ad revenues. The market analysis system can facilitate the ad bidding/auction process between the two entities (e.g., publisher(s)/publisher content servers and demand partners/advertising networks). For example, an online publisher or content provider may have 100 ad spots that it wants to fill. The market analysis system can help the publisher and/or content provider to automatically set/adjust different minimum floor prices for different ad placements. The market analysis system can help the publisher to optimize the overall earnings of an ad placement for an ad unit. The market analysis system can also help to determine the optimal pricing of different ad units (to maximize the overall ad earnings of a displayable "real estate"), and set minimum floor prices above which advertisers are willing to pay for those ad units. This can ensure that advertisers are not be turned away by overly-high prices, and as such publishers will not incur lost profits, and is therefore advantageous for both sides of the transacting parties.

Computer Control Systems

Figure 16:
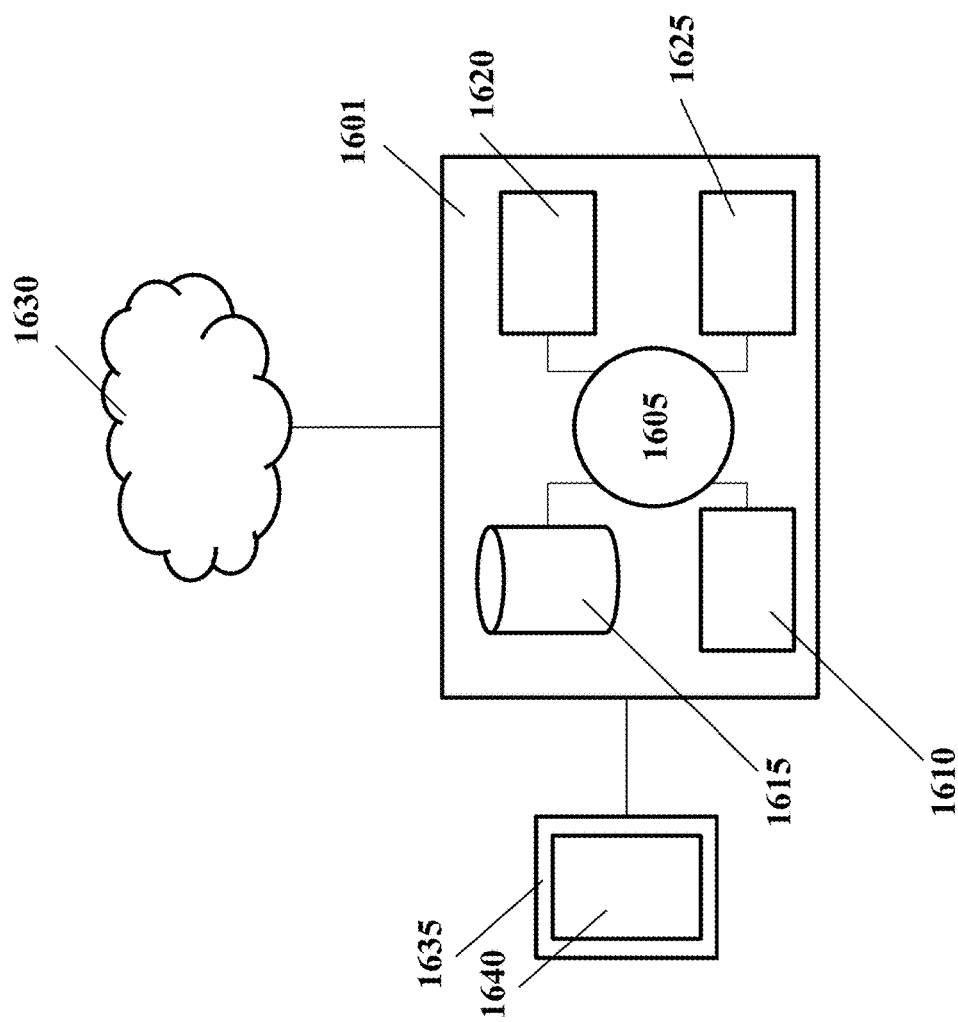
FIG. 16 shows a computer control system that is programmed or otherwise configured to implement methods provided herein.

The present disclosure provides computer control systems that are programmed to implement methods of the disclosure. FIG. 16 shows a computer system 1601 that is programmed or otherwise configured to implement a method for optimizing publisher profits in online advertising based on real market movements. The computer system 1601 can regulate various aspects of online ad pricing of the present disclosure, such as, for example, one or more minimum floor prices by which bids for different ad placements are processed. The computer system 1601 can be an electronic device of a user or a computer system that is remotely located with respect to the electronic device. The electronic device can be a mobile electronic device.

The computer system 1601 includes a central processing unit (CPU, also "processor" and "computer processor" herein) 1605, which can be a single core or multi core processor, or a plurality of processors for parallel processing. The computer system 1601 also includes memory or memory location 1610 (e.g., random-access memory, read-only memory, flash memory), electronic storage unit 1615 (e.g., hard disk), communication interface 1620 (e.g., network adapter) for communicating with one or more other systems, and peripheral devices 1625, such as cache, other memory, data storage and/or electronic display adapters. The memory 1610, storage unit 1615, interface 1620 and peripheral devices 1625 are in communication with the CPU 1605 through a communication bus (solid lines), such as a motherboard. The storage unit 1615 can be a data storage unit (or data repository) for storing data. The computer system 1601 can be operatively coupled to a computer network ("network") 1630 with the aid of the communication interface 1620. The network 1630 can be the Internet, an internet and/or extranet, or an intranet and/or extranet that is in communication with the Internet. The network 1630 in some cases is a telecommunication and/or data network. The network 1630 can include one or more computer servers, which can enable distributed computing, such as cloud computing. The network 1630, in some cases with the aid of the computer system 1601, can implement a peer-to-peer network, which may enable devices coupled to the computer system 1601 to behave as a client or a server.

The CPU 1605 can execute a sequence of machine-readable instructions, which can be embodied in a program or software. The instructions may be stored in a memory location, such as the memory 1610. The instructions can be directed to the CPU 1605, which can subsequently program or otherwise configure the CPU 1605 to implement methods of the present disclosure. Examples of operations performed by the CPU 1605 can include fetch, decode, execute, and writeback.

The CPU 1605 can be part of a circuit, such as an integrated circuit. One or more other components of the system 1601 can be included in the circuit. In some cases, the circuit is an application specific integrated circuit (ASIC).

The storage unit 1615 can store files, such as drivers, libraries and saved programs. The storage unit 1615 can store user data, e.g., user preferences and user programs. The computer system 1601 in some cases can include one or more additional data storage units that are external to the computer system 1601, such as located on a remote server that is in communication with the computer system 1601 through an intranet or the Internet.

The computer system 1601 can communicate with one or more remote computer systems through the network 1630. For instance, the computer system 1601 can communicate with a remote computer system of a user (e.g., an end user, a consumer, a publisher, an advertiser, an advertising broker, an advertising agency, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1601 via the network 1630.

Methods as described herein can be implemented by way of machine (e.g., computer processor) executable code stored on an electronic storage location of the computer system 1601, such as, for example, on the memory 1610 or electronic storage unit 1615. The machine executable or machine readable code can be provided in the form of software. During use, the code can be executed by the processor 1605. In some cases, the code can be retrieved from the storage unit 1615 and stored on the memory 1610 for ready access by the processor 1605. In some situations, the electronic storage unit 1615 can be precluded, and machine-executable instructions are stored on memory 1610.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1601 can include or be in communication with an electronic display 1635 that comprises a user interface (UI) 1640 for providing, for example, a portal for managing ad inventory and monitoring ad price market movements. A publisher can view the optimization of ad revenue via the portal (e.g., the dashboard shown in FIG. 15). The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1605. The algorithm can be configured to divide an advertisement (ad) placement for an ad unit into a plurality of price levels. For example, the ad unit levels may comprise a middle level having a first price range, a top level having a second price range, and a bottom level having a third price range. A plurality of minimum floor prices may be provided between ad unit levels, for example as described elsewhere herein. The different floor prices may be used as price floor testing levels in order to test market movements for an ad unit (i.e., whether advertisers are willing to pay more or pay less for a given ad unit). The algorithm can be configured to generate a plurality of variables that are configured to test for the real market movements. The plurality of variables may comprise (1) a first variable in which the first minimum floor price is used as a baseline, (2) a second variable in which the second minimum floor price is set to be a predetermined percentage above the first minimum floor price, and (3) a third variable in which the third minimum floor price is set to be the predetermined percentage below the first minimum floor price. The algorithm may be further configured to process ad impressions based on the plurality of variables within a time period to evaluate the real market movements for the ad unit, and determine whether to adjust one or more of the minimum floor prices based on a score for each variable calculated within the time period.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for optimizing publisher profits in online advertising based on market movements detected via testing of the market using a plurality of variables, and for optimizing utilization of an entire or available displayable webpage area for online advertisement (ad) placements, wherein said method permits a publisher to view in real-time on a user interface of a computing device the market movements for an advertisement (ad) unit and an amount of optimized profits for the ad unit at a given point in a time period, the method comprising:
   receiving an ad placement for the ad unit;
   dividing the ad placement into a plurality of levels;
   generating the plurality of variables in computer memory that are configured to monitor the market movements related to pricing of the ad unit between levels, wherein the plurality of variables comprise (1) a first variable in which a first minimum floor price is used as a baseline, (2) a second variable in which a second minimum floor price is set to be a predetermined percentage above the first minimum floor price, and (3) a third variable in which a third minimum floor price is set to be the predetermined percentage below the first minimum floor price, wherein the plurality of variables is usable to determine sensitivity for different pricings of the ad unit, wherein the second and third minimum floor prices are usable to evaluate whether a buyer is willing to pay more or pay less for the ad unit, and wherein the second and third variables are usable to detect whether there is an upward movement or downward movement in market demand for the ad unit;
   processing auction results of different ad impressions in real-time based on the plurality of variables within a time period to evaluate the market movements for the ad unit;
   calculating scores for the plurality of variables, which scores are indicative of whether the market demand for the ad unit is moving upwards, moving downwards, or unchanged during the time period, wherein the score for each variable is calculated without processing buyer-specific information;
   automatically determining whether to adjust one or more of the minimum floor prices based on the scores; and
   displaying, the score for each variable on a graph as a function of time and any adjustments to the one or more minimum floor prices in response to the market demand for the ad unit, as one or more graphical visual objects in a user interface on the computing device of the publisher, such that the publisher is able to view in real-time on the user interface of the computing device the market movements for the ad unit and the amount of optimized profits for the ad unit at the given point in the time period based on the calculated scores for the plurality of variables, wherein the amount of optimized profits for the ad unit is a result of optimizing the utilization of the entire or available displayable webpage area for online ad placements.

2. The method of claim 1, wherein the one or more minimum floor prices are dynamically adjusted over different time periods to optimize the publisher profits for an ad call.

3. The method of claim 1, wherein the first minimum floor price is less than the second minimum floor price, and greater than the third minimum floor price.

4. The method of claim 1, comprising:
   obtaining a plurality of metrics for each variable during each time period, wherein said plurality of metrics comprise: (i) number of ad requests, (ii) number of ad requests, (iii) number of fill impressions, (iv) fill rate, (v) cost per mille (CPM), and/or (vi) earnings.

5. The method of claim 4, wherein the score for each variable is calculated based on (i) the earnings at a first level and at a second level during the time period, and (ii) the number of ad requests at the first level.

6. The method of claim 5, wherein:
   (1) a first score for the first variable is calculated by (a) summing the earnings at the first minimum floor price at the first level and the second level, and (b) dividing the earnings by the number of ad requests at the first minimum floor price at the first level;

(2) a second score for the second variable is calculated by (a) summing the earnings at the second minimum floor price at the first level and the second level, and (b) dividing the earnings by the number of ad requests at the second minimum floor price at the first level; and (3) a third score for the third variable is calculated by (a) summing the earnings at the third minimum floor price at the first level and the second level, and (b) dividing the earnings by the number of ad requests at the third minimum floor price at the first level.

7. The method of claim 6, further comprising:
comparing the first score, the second score, and the third score for the time period to yield a comparison of which score has a highest value; and
determining whether to adjust at least one of the first minimum floor price, second minimum floor price, or third floor price based on said comparison.

8. The method of claim 7, wherein the first minimum floor price at the first level is adjusted to: (1) correspond to the first minimum floor price at the second level when the first score is higher than each of the second score and third score, (2) correspond to the second minimum floor price at the second level when the second score is higher than each of the first score and third score, or (3) correspond to the third minimum floor price at the second level when the third score is higher than each of the first score and second score.

9. The method of claim 1, wherein the processing of the auction results of the different ad impressions in real-time comprises:
processing the auction results of the ad impressions based on the plurality of variables at a first level selected from the plurality of levels, and then processing the auction results of the ad impressions that are unfilled from the first level at a second level selected from the plurality of levels,
wherein the second level is below the first level, and wherein processing the auction results of the ad impressions at the first level and then at the second level aids in optimizing the publisher profits (i) by minimizing a number of unfilled ad impressions and (ii) by maximizing an entire displayable area for the ad placement, without focusing on a single minimum floor price.

10. The method of claim 9, wherein the scores for the plurality of variables are calculated based on (i) earnings at both the first and second levels and (ii) a number of ad requests at the first level.

11. The method of claim 7, wherein the first minimum floor price remains the same across two or more time periods when the first score has the highest value across the two or more time periods.

12. The method of claim 7, wherein the first minimum floor price is continuously adjusted upwards across two or more time periods when the second score has the highest value across the two or more time periods.

13. The method of claim 7, wherein the first minimum floor price is continuously adjusted downwards across two or more time periods when the third score has the highest value across the two or more time periods.

14. The method of claim 1, wherein the first variable is indicative of little to no market movement, such that an ad price for the ad placement substantially tracks the first minimum floor price.

15. The method of claim 1, wherein the second variable is indicative of an upward market movement, such that an ad price for the ad placement substantially tracks the second minimum floor price.

16. The method of claim 1, wherein the third variable is indicative of a downward market movement, such that an ad price for the ad placement substantially tracks the third minimum floor price.

17. The method of claim 1, wherein during the time period, the first minimum floor price is applied for a first predetermined amount of time, the second minimum floor price is applied for a second predetermined amount of time, and the third minimum floor price is applied for a third predetermined amount of time.

18. The method of claim 1, wherein the first minimum floor price, second minimum floor price, and third minimum floor price are applied in a random or pseudorandom order during the time period.

19. The method of claim 1, wherein the first minimum floor price, second minimum floor price, and third minimum floor price are applied in a predetermined order during the time period.

20. The method of claim 1, wherein the ad impressions are segmented into two or more categories, and wherein the two or more categories comprise: (1) device types including (i) mobile devices and (ii) desktop personal computers sub-categories, and (2) geographical regions where the ad impressions are displayed to a plurality of end users.

21. The method of claim 1, wherein the ad impressions at the first, second, and third minimum floor prices are provided to each user of a plurality of end-users on different display areas of a computer-implemented graphical interface, and wherein the different display areas comprise a central area and a peripheral area of the computer-implemented graphical interface.

22. The method of claim 21, wherein the profits of the ad placement are optimized by utilizing the different display areas of the computer-implemented graphical interface.

23. The method of claim 1, wherein the second variable and the third variable are test variables that are usable in conjunction with the first variable to monitor the market movements related to the pricing of the ad unit between levels.

24. The method of claim 1, wherein the score for each variable is calculated by a third party entity that is different from an entity that administers an ad server and/or an advertising network.

25. The method of claim 6, further comprising: plotting the score for each variable on the graph as a function of time over a plurality of time periods, wherein said graph is configured to be displayed on a computer-implemented display.

26. The method of claim 25, further comprising: determining a change in the score for each variable from the graph on the computer-implemented display.

27. The method of claim 6, further comprising: plotting the minimum floor price for each variable on a graph as a function of time over the plurality of time periods, wherein said graph is configured to be displayed on a computer-implemented display.

28. The method of claim 27, further comprising: determining a change in the minimum floor price for each variable from the graph on the computer-implemented display.

29. The method of claim 1, wherein the auction results of the different ad impressions are obtained from an ad exchange server or an ad server.

30. The method of claim 29, wherein said method is implemented on a market analysis system that is separate from the ad exchange server or the ad server.

31. The method of claim 1, wherein the buyer-specific information comprises identities of one or more buyers, and historical bid data including bid prices and patterns of the one or more buyers.

32. The method of claim 1, wherein the second and third variables are usable to test market demand for the ad unit by offering the ad unit at the second and third minimum floor prices to one or more buyers at different points within the time period to detect whether there is an upward movement or downward movement in the market demand for the ad unit.

33. The method of claim 1, wherein the scores for the plurality of variables are configured to factor in any discrepancies between a number of ad impressions and a number of matched requests for the ad unit.

34. A system for optimizing publisher profits in online advertising based on market movements detected via testing of the market using a plurality of variables, and for optimizing utilization of an entire or available displayable webpage area for online advertisement (ad) placements, wherein said system permits a publisher to view in real-time on a user interface of a computing device the market movements for an advertisement (ad) unit and an amount of optimized profits for the ad unit at a given point in a time period, said system comprising:

a market analysis server in communication with an ad exchange server and one or more advertising network servers, wherein the market analysis server comprises one or more processors that are individually or collectively configured to:

receive an ad placement for the ad unit;

divide the ad placement into a plurality of levels;

generate the plurality of variables in a computer memory that are configured to monitor the market movements related to pricing of the ad unit between levels, wherein the plurality of variables comprise (1) a first variable in which a first minimum floor price is used as a baseline, (2) a second variable in which a second minimum floor price is set to be a predetermined percentage above the first minimum floor price, and (3) a third variable in which a third minimum floor price is set to be the predetermined percentage below the first minimum floor price, wherein the plurality of variables is usable to determine sensitivity for different pricings of the ad unit, wherein the second and third minimum floor prices are usable to evaluate whether a buyer is willing to pay more or pay less for the ad unit, and wherein the second and third variables are usable to detect whether there is an upward movement or downward movement in market demand for the ad unit;

process auction results of different ad impressions via the ad server in real-time based on the plurality of variables within a time period to evaluate the market movements for the ad unit;

calculate scores for the plurality of variables, which scores are indicative of whether the market demand for the ad unit is moving upwards, moving downwards, or unchanged during the time period, wherein the score for each variable is calculated without processing buyer-specific information;

automatically determine whether to adjust one or more of the minimum floor prices based on the scores; and display, the score for each variable on a graph as a function of time and any adjustments to the one or more minimum floor prices in response to the market demand for the ad unit, as one or more graphical visual objects in a user interface on the computing device of the publisher, such that the publisher is able to view in real-time on the user interface of the computing device the market movements for the ad unit and the amount of optimized profits for the ad unit at the given point in the time period based on the calculated scores for the plurality of variables, wherein the amount of optimized profits for the ad unit is a result of optimizing the utilization of the entire or available displayable webpage area for online ad placements.

35. A tangible computer readable medium storing instructions that, when executed by one or more servers, causes the one or more servers to perform a computer-implemented method for optimizing publisher profits in online advertising based on market movements detected via testing of the market using a plurality of variables, and for optimizing utilization of an entire or available displayable webpage area for online advertisement (ad) placements, wherein said method permits a publisher to view in real-time on a user interface of a computing device the market movements for an advertisement (ad) unit and an amount of optimized profits for the ad unit at a given point in a time period, said method comprising:

receiving an ad placement for the ad unit;

dividing the ad placement into a plurality of levels;

generating the plurality of variables that are configured to monitor the market movements related to pricing of the ad unit between levels, wherein the plurality of variables comprise (1) a first variable in which a first minimum floor price is used as a baseline, (2) a second variable in which a second minimum floor price is set to be a predetermined percentage above the first minimum floor price, and (3) a third variable in which a third minimum floor price is set to be the predetermined percentage below the first minimum floor price, wherein the plurality of variables is usable to determine sensitivity for different pricings of the ad unit, wherein the second and third minimum floor prices are usable to evaluate whether a buyer is willing to pay more or pay less for the ad unit, and wherein the second and third variables are usable to detect whether there is an upward movement or downward movement in market demand for the ad unit;

processing auction results of different ad impressions in real-time based on the plurality of variables within a time period to evaluate the market movements for the ad unit;

calculating scores for the plurality of variables, which scores are indicative of whether the market demand for the ad unit is moving upwards, moving downwards, or unchanged during the time period, wherein the score for each variable is calculated without processing buyer-specific information;

automatically determining whether to adjust one or more of the minimum floor prices based on the scores; and displaying, the score for each variable on a graph as a function of time and any adjustments to the one or more minimum floor prices in response to the market demand for the ad unit, as one or more graphical visual objects in a user interface on the computing device of the publisher, such that the publisher is able to view in real-time on the user interface of the computing device the market movements for the ad unit and the amount of optimized profits for the ad unit at the given point in the time period based on the calculated scores for the plurality of variables, wherein the amount of optimized profits for the ad unit is a result of optimizing the utilization of the entire or available displayable webpage area for online ad placements.

* * * * *